US010402261B2

(12) United States Patent
Sherlock et al.

(10) Patent No.: US 10,402,261 B2
(45) Date of Patent: Sep. 3, 2019

(54) PREVENTING DATA CORRUPTION AND SINGLE POINT OF FAILURE IN FAULT-TOLERANT MEMORY FABRICS

(71) Applicant: HEWLETT PACKARD ENTERPRISE DEVELPMENT LP, Houston, TX (US)

(72) Inventors: Derek Alan Sherlock, Ft. Collins, CO (US); Harvey Ray, Ft. Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1 day.

(21) Appl. No.: 15/500,080

(22) PCT Filed: Mar. 31, 2015

(86) PCT No.: PCT/US2015/023708
§ 371 (c)(1),
(2) Date: Jan. 30, 2017

(87) PCT Pub. No.: WO2016/159996
PCT Pub. Date: Oct. 6, 2016

(65) Prior Publication Data
US 2017/0242745 A1 Aug. 24, 2017

(51) Int. Cl.
G06F 11/00 (2006.01)
G06F 11/07 (2006.01)
(Continued)

(52) U.S. Cl.
CPC ........ *G06F 11/0793* (2013.01); *G06F 11/079* (2013.01); *G06F 11/0727* (2013.01);
(Continued)

(58) Field of Classification Search
CPC ............ G06F 11/0793; G06F 11/0727; G06F 11/0751; G06F 11/079; G06F 11/2053; G06F 11/2069
See application file for complete search history.

(56) References Cited

U.S. PATENT DOCUMENTS 5,032,744 A 7/1991 Wai
5,243,592 A 9/1993 Perlman et al.
(Continued)

FOREIGN PATENT DOCUMENTS

CN 101576805 11/2009
CN 102521058 A 6/2012
(Continued)

OTHER PUBLICATIONS

Do I need a second RAID controller for fault-tolerance ?, (Research Paper); Aug. 22, 2010; 2 Pages; http://serverfault.com/questions/303869/do-i-need-a-second-raid-controller-for-fault-tolerance.
(Continued)

*Primary Examiner* — Joseph D Manoskey
(74) *Attorney, Agent, or Firm* — Rathe Lindenbaum LLP

(57) ABSTRACT

An example device in accordance with an aspect of the present disclosure includes a redundancy controller and/or memory module to prevent data corruption and single point of failure in a fault-tolerant memory fabric. Devices include engines to issue and/or respond to primitive requests, identify failures and/or fault conditions, and receive and/or issue containment mode indications.

14 Claims, 12 Drawing Sheets

(51) Int. Cl.
  *G06F 11/20* (2006.01)
  *G06F 11/10* (2006.01)
(52) U.S. Cl.
  CPC ...... *G06F 11/0751* (2013.01); *G06F 11/1076* (2013.01); *G06F 11/2017* (2013.01); *G06F 11/2092* (2013.01)

(56) References Cited

U.S. PATENT DOCUMENTS

| | | | |
|---|---|---|---|
| 5,327,553 A | 7/1994 | Jewett et al. | |
| 5,533,999 A | 7/1996 | Hood et al. | |
| 5,546,535 A | 8/1996 | Stallmo et al. | |
| 5,555,266 A | 9/1996 | Buchholz et al. | |
| 5,633,996 A | 5/1997 | Hayashi et al. | |
| 5,633,999 A | 5/1997 | Clowes et al. | |
| 5,724,046 A | 3/1998 | Martin et al. | |
| 5,905,871 A | 5/1999 | Buskens et al. | |
| 6,073,218 A | 6/2000 | DeKoning et al. | |
| 6,081,907 A | 6/2000 | Witty et al. | |
| 6,092,191 A | 7/2000 | Shimbo et al. | |
| 6,141,324 A | 10/2000 | Abbott et al. | |
| 6,151,659 A | 11/2000 | Solomon et al. | |
| 6,181,704 B1 | 1/2001 | Drottar et al. | |
| 6,389,373 B1 | 5/2002 | Ohya | |
| 6,457,098 B1 | 9/2002 | DeKoning et al. | |
| 6,467,024 B1 | 10/2002 | Bish et al. | |
| 6,490,659 B1 | 12/2002 | McKean et al. | |
| 6,502,165 B1 | 12/2002 | Kishi et al. | |
| 6,510,500 B2 | 1/2003 | Sarkar | |
| 6,542,960 B1 | 4/2003 | Wong et al. | |
| 6,654,830 B1 | 11/2003 | Taylor et al. | |
| 6,735,645 B1 | 5/2004 | Weber et al. | |
| 6,826,247 B1 | 11/2004 | Elliott et al. | |
| 6,834,326 B1 | 12/2004 | Wang et al. | |
| 6,911,864 B2 | 6/2005 | Bakker et al. | |
| 6,938,091 B2 | 8/2005 | Das Sharma | |
| 6,970,987 B1 | 11/2005 | Ji et al. | |
| 7,366,808 B2 | 4/2008 | Kano et al. | |
| 7,506,368 B1 | 3/2009 | Kersey et al. | |
| 7,738,540 B2 | 6/2010 | Yamasaki et al. | |
| 7,839,858 B2 | 11/2010 | Wiemann et al. | |
| 7,908,513 B2 | 3/2011 | Ogasawara et al. | |
| 7,934,055 B2 | 4/2011 | Flynn et al. | |
| 7,996,608 B1 | 8/2011 | Chatterjee et al. | |
| 8,005,051 B2 | 8/2011 | Watanabe | |
| 8,018,890 B2 | 9/2011 | Venkatachalam et al. | |
| 8,054,789 B2 | 11/2011 | Boariu et al. | |
| 8,103,869 B2 | 1/2012 | Balandin et al. | |
| 8,135,906 B2 | 3/2012 | Wright et al. | |
| 8,161,236 B1 | 4/2012 | Noveck et al. | |
| 8,169,908 B1 | 5/2012 | Sluiter et al. | |
| 8,171,227 B1 | 5/2012 | Goldschmidt et al. | |
| 8,332,704 B2 | 12/2012 | Chang et al. | |
| 8,341,459 B2 | 12/2012 | Kaushik et al. | |
| 8,386,834 B1 | 2/2013 | Goel et al. | |
| 8,386,838 B1 | 2/2013 | Byan | |
| 8,462,690 B2 | 6/2013 | Chang et al. | |
| 8,483,116 B2 | 7/2013 | Chang et al. | |
| 8,605,643 B2 | 12/2013 | Chang et al. | |
| 8,619,606 B2 | 12/2013 | Nagaraja | |
| 8,621,147 B2 | 12/2013 | Galloway et al. | |
| 8,667,322 B1 | 3/2014 | Chatterjee et al. | |
| 8,700,570 B1 | 4/2014 | Marathe et al. | |
| 8,793,449 B1 | 7/2014 | Kimmel | |
| 8,812,901 B2 | 8/2014 | Sheffield, Jr. | |
| 9,128,948 B1 | 9/2015 | Raorane | |
| 9,166,541 B2 | 10/2015 | Funato et al. | |
| 9,298,549 B2 | 3/2016 | Camp et al. | |
| 9,621,934 B2 | 4/2017 | Seastrom et al. | |
| 2001/0002480 A1 | 5/2001 | DeKoning et al. | |
| 2002/0162076 A1 | 10/2002 | Talagala et al. | |
| 2003/0037071 A1 | 2/2003 | Harris et al. | |
| 2003/0126315 A1* | 7/2003 | Tan ................ G06F 11/201 710/1 | |
| 2004/0133573 A1 | 7/2004 | Miloushev et al. | |
| 2004/0233078 A1 | 11/2004 | Takehara | |
| 2005/0027951 A1 | 2/2005 | Piccirillo et al. | |
| 2005/0044162 A1 | 2/2005 | Liang et al. | |
| 2005/0120267 A1* | 6/2005 | Burton ................ G06F 11/0727 714/13 | |
| 2005/0144406 A1 | 6/2005 | Chong | |
| 2005/0157697 A1 | 7/2005 | Lee et al. | |
| 2006/0112304 A1* | 5/2006 | Subramanian ...... G06F 11/0727 714/6.11 | |
| 2006/0129559 A1 | 6/2006 | Sankaran et al. | |
| 2006/0264202 A1 | 11/2006 | Hagmeier et al. | |
| 2007/0028041 A1 | 2/2007 | Hallyal et al. | |
| 2007/0140692 A1 | 6/2007 | DeCusatis et al. | |
| 2007/0168693 A1 | 7/2007 | Pittman | |
| 2007/0174657 A1 | 7/2007 | Ahmadian et al. | |
| 2008/0060055 A1 | 3/2008 | Lau | |
| 2008/0137669 A1 | 6/2008 | Balandina et al. | |
| 2008/0201616 A1 | 8/2008 | Ashmore | |
| 2008/0281876 A1 | 11/2008 | Mimatsu | |
| 2009/0080432 A1 | 3/2009 | Kolakeri et al. | |
| 2009/0259882 A1 | 10/2009 | Shellhamer | |
| 2009/0313313 A1 | 12/2009 | Yokokawa et al. | |
| 2010/0107003 A1 | 4/2010 | Kawaguchi | |
| 2010/0114889 A1 | 5/2010 | Rabii et al. | |
| 2011/0109348 A1 | 5/2011 | Chen et al. | |
| 2011/0173350 A1* | 7/2011 | Coronado ............ G06F 13/385 710/8 | |
| 2011/0208994 A1 | 8/2011 | Chambliss et al. | |
| 2011/0213928 A1 | 9/2011 | Grube et al. | |
| 2011/0246819 A1 | 10/2011 | Callaway et al. | |
| 2011/0314218 A1 | 12/2011 | Bert | |
| 2012/0032718 A1 | 2/2012 | Chan et al. | |
| 2012/0059800 A1 | 3/2012 | Guo | |
| 2012/0096329 A1 | 4/2012 | Taranta et al. | |
| 2012/0137098 A1 | 5/2012 | Wang et al. | |
| 2012/0166699 A1 | 6/2012 | Kumar et al. | |
| 2012/0166909 A1 | 6/2012 | Schmisseur et al. | |
| 2012/0201289 A1 | 8/2012 | Abdalla et al. | |
| 2012/0204032 A1 | 8/2012 | Wilkins et al. | |
| 2012/0213055 A1 | 8/2012 | Bajpai et al. | |
| 2012/0297272 A1 | 11/2012 | Bakke et al. | |
| 2012/0311255 A1 | 12/2012 | Chambliss et al. | |
| 2013/0060948 A1 | 3/2013 | Ulrich et al. | |
| 2013/0128721 A1 | 5/2013 | DeCusatis et al. | |
| 2013/0128884 A1 | 5/2013 | DeCusatis et al. | |
| 2013/0138759 A1 | 5/2013 | Chen et al. | |
| 2013/0148702 A1 | 6/2013 | Payne | |
| 2013/0227216 A1 | 8/2013 | Cheng et al. | |
| 2013/0246597 A1 | 9/2013 | Iizawa et al. | |
| 2013/0297976 A1 | 11/2013 | McMillen | |
| 2013/0311822 A1 | 11/2013 | Kotzur et al. | |
| 2013/0312082 A1 | 11/2013 | Izu et al. | |
| 2014/0067984 A1 | 3/2014 | Danilak | |
| 2014/0095865 A1 | 4/2014 | Yerra et al. | |
| 2014/0115232 A1 | 4/2014 | Goss et al. | |
| 2014/0136799 A1 | 5/2014 | Fortin | |
| 2014/0269731 A1 | 9/2014 | Decusatis et al. | |
| 2014/0281688 A1 | 9/2014 | Tiwari et al. | |
| 2014/0304469 A1 | 10/2014 | Wu | |
| 2014/0331297 A1 | 11/2014 | Innes et al. | |
| 2015/0012699 A1 | 1/2015 | Rizzo et al. | |
| 2015/0095596 A1 | 4/2015 | Yang et al. | |
| 2015/0146614 A1 | 5/2015 | Yu et al. | |
| 2015/0199244 A1 | 7/2015 | Venkatachalam et al. | |
| 2015/0288752 A1 | 10/2015 | Voigt | |
| 2016/0034186 A1 | 2/2016 | Weiner et al. | |
| 2016/0170833 A1* | 6/2016 | Segura ................ G06F 11/1088 714/6.23 | |
| 2016/0196182 A1 | 7/2016 | Camp et al. | |
| 2016/0226508 A1 | 8/2016 | Kurooka et al. | |
| 2017/0253269 A1 | 9/2017 | Kanekawa et al. | |
| 2017/0302409 A1 | 10/2017 | Sherlock | |
| 2017/0346742 A1 | 11/2017 | Shahar et al. | |

FOREIGN PATENT DOCUMENTS

| | | |
|---|---|---|
| CN | 104333358 A | 2/2015 |
| EP | 1347369 B1 | 11/2012 |

(56) References Cited

FOREIGN PATENT DOCUMENTS

| IN | 1546/MUM/2013 | | 3/2015 |
|---|---|---|---|
| TW | 201346530 | | 11/2013 |
| WO | 02/91689 | A1 | 11/2002 |
| WO | 2014/120136 | A1 | 8/2014 |

OTHER PUBLICATIONS

EMC2; High Availability and Data Protection with EMC Isilon Scale-out NAS, (Research Paper); Nov. 2013; 36 Pages.
International Search Report and Written Opinion; PCT/US2015/023708; dated Apr. 22, 2016; 13 pages.
Xingyuan, T. et al., "An Offset Cancellation Technique in a Switched-Capacitor Comparator for SAR ADCs"; (Research Paper), Journal of Semiconductors 33.1., Jan. 2012, 5 pages, http://www.jos.ac.cn/bdtxbcn/ch/reader/create_pdf.aspx?file_no=11072501.
Razavi, B. et al., "Design Techniques for High-Speed, High-Resolution Comparators," (Research Paper). IEEE Journal of Solid-State Circuits 27.12, Dec. 12, 1992, pp. 1916-1926, http://www.seas.ucla.edu/brweb/papers/Journals/R%26WDec92_2.pdf.
Mao, Y. et al., A New Parity-based Migration Method to Expand Raid-5, (Research Paper), Nov. 4, 2013, 11 Pages.
Kimura et al., "A 28 Gb/s 560 mW Multi-Standard SerDes With Single-Stage Analog Front-End and 14-Tap Decision Feedback Equalizer in 28 nm CMOS," IEEE Journal of Solid-State Circuits, vol. 49, No. 12, Dec. 2014, pp. 3091-3103.
International Searching Authority, The International Search Report and the Written Opinion, Feb. 26, 2015, 10 Pages.
International Search Report and Written Opinion; PCT/US2015/013898; dated Oct. 8, 2015; 11 pages.
International Search Report and Written Opinion received for PCT Patent Application No. PCT/US2015/013817, dated Oct. 29, 2015, 11 pages.
International Search Report and Written Opinion received for PCT Patent Application No. PCT/US2014/053704, dated May 15, 2015, 11 pages.
International Preliminary Report on Patentability received for PCT Patent Application No. PCT/US2015/023708, dated Oct. 12, 2017, 10 pages.
International Preliminary Report on Patentability received for PCT Patent Application No. PCT/US2014/053704, dated Mar. 16, 2017, 10 pages.
Amiri, K. et al., Highly Concurrent Shared Storage, (Research Paper), Sep. 7, 1999, 25 Pages.
Almeida, P. S., et al; Scalable Eventually Consistent Counters Over Unreliable Networks; Jul. 12, 2013; 32 Pages.
Li, M. et al.: Toward I/O-Efficient Protection Against Silent Data Corruptions in RAID Arrays, (Research Paper); Jun. 2-6, 2014; 12 Pages.
Kang, Y. et al., "Fault-Tolerant Flow Control in On-Chip Networks," (Research Paper), Proceedings for IEEE, May 3-6, 2010, 8 pages, available at http://citeseerx.ist.psu.edu/viewdoc/download?doi=10.1.1.228.7865&rep=rep1&type=pdf.
International Search Report and Written Opinion received for PCT Patent Application No. PCT/US2015/013921, dated Oct. 28, 2015, 10 pages.
International Search Report and Written Opinion received for PCT Patent Application No. PCT/US2015/013898, dated Oct. 8, 2015, 9 pages.
International Search Report and Written Opinion received for PCT Patent Application No. PCT/US2014/062196, dated Jun. 30, 2015, 13 pages.
International Search Report and Written Opinion received for PCT Patent Application No. PCT/US2014/049193, dated Feb. 26, 2015, 8 pages.
International Preliminary Report on Patentability received for PCT Patent Application No. PCT/US2015/013921, dated Aug. 10, 2017, 9 pages.
International Preliminary Report on Patentability received for PCT Patent Application No. PCT/US2015/013898, dated Aug. 10, 2017, 8 pages.
International Preliminary Report on Patentability received for PCT Patent Application No. PCT/US2015/013817, dated Aug. 10, 2017, 9 pages.
International Preliminary Report on Patentability received for PCT Patent Application No. PCT/US2014/062196, dated May 4, 2017, 12 pages.
International Preliminary Report on Patentability received for PCT Patent Application No. PCT/US2014/049193, dated Feb. 9, 2017, 7 pages.

\* cited by examiner

PREVENTING DATA CORRUPTION AND SINGLE POINT OF FAILURE IN FAULT-TOLERANT MEMORY FABRICS

BACKGROUND

Implementations of redundant arrays of independent disks (RAID) generally use a single redundancy controller as a point of synchronization for RAID operations across multiple media controllers. The single redundancy controller therefore introduces a disadvantage to systems, because it can serve as a single point of failure, thereby reducing high-availability features of the storage system.

BRIEF DESCRIPTION OF THE DRAWINGS/FIGURES

DETAILED DESCRIPTION

Figure 1:
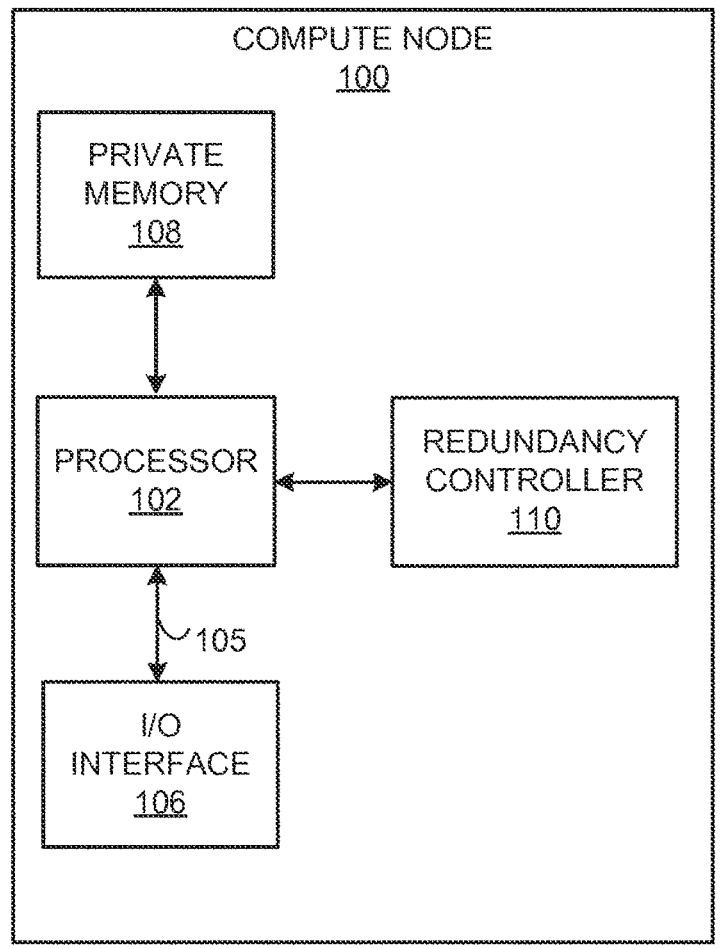
FIG. 1 is a block diagram of a compute node including a redundancy controller according to an example.

Data storage devices, such as volatile and non-volatile memory, can include fault tolerance mechanisms to ensure that data remains available in the event of a device error or failure. An example of a fault tolerance mechanism provided to data storage devices is a RAID storage technology, which controls multiple memory modules and provides fault tolerance by storing data with redundancy. RAID technology may store data with redundancy in a variety of ways. Examples of redundant data storage include duplicating data and storing the data in multiple memory modules and adding parity to store calculated error recovery bits. The multiple memory modules, which may include the data and associated parity, may be accessed concurrently by multiple redundancy controllers.

A distributed storage system containing multiple redundancy controllers and multiple RAIDed media controllers may be exposed to various issues in the event of a memory module failure, e.g., in view of the use of multiple redundancy controllers acting independently (e.g. on behalf of multiple servers), accessing data RAIDed across multiple media controllers. Such issues include data corruption, resulting from the lack of synchronization of a "degraded mode" entry between multiple redundancy controllers, in the event that multiple redundancy controllers are affected by a single memory module failure. Data corruption also may result from the subsequent use of a RAID grouping in normal operation mode following a system reboot, an interruption such as power failure, or other RAID group remounting event, when the RAID grouping had previously been used in degraded mode owing to a memory module failure. Additionally, data corruption may result from inconsistency between different redundancy controllers with regard to their knowledge about the failure of a particular memory controller, in cases where such failure is transient, intermittent, or address-dependent.

Example systems and methods described herein may avoid these and other issues, by protecting system survivability and shared RAID data from corruption by a failing memory module. Examples can employ high-availability mechanisms to guarantee integrity of the RAID-protected data, even in the event of a failure or unplanned outage of one or more of the memory modules, non-volatile memory (NVM) devices, or media controllers. Such mechanisms can ensure that surviving servers continue to have uninterrupted access to the RAID data, and that the RAID data is not corrupted or otherwise invalidated by the failure of the faulty server. Aspects may relate to the system and redundancy controller features, behaviors and journaling practices that support RAID, effective in multiple-redundancy-controller environments.

Additionally, examples described herein enable data integrity and availability benefits of RAID redundancy to be available even across multiple servers sharing or aggregating pooled, distributed, redundant RAID storage, and even in cases where a memory module fails while affected RAID storage is being accessed by multiple redundancy controllers, and even in cases where the memory module failure is intermittent, transient, or address specific. In contrast to other RAID approaches using a centralized RAID/redundancy controller, examples described herein eliminate the hazard of such a single point of failure. Furthermore, examples can ensure that data integrity is preserved even across multiple reboots of the system or re-mounts of the RAID groupings, even in the event of power failure or other unexpected interruptions, and even if memory modules are moved/rearranged between systems after a memory module failure.

The following terms are used throughout the present disclosure. The term fabric may mean some combination of interconnected fabric devices used to convey packet-based information between endpoint components. The term memory fabric may mean a fabric used, at least in part, to provide connectivity between redundancy controllers and media controllers. The term protocol may mean the packet level semantic convention used by protocol agents. The term protocol agents may mean endpoints (e.g., producers and consumers of data) that communicate with each other over a memory fabric. The terms request or request packet may mean a packet sent from a redundancy controller to a media controller, usually indicating a desired memory activity such as a read or a write. The terms response or response packet may mean a packet sent from a media controller back to a redundancy controller from which it earlier received a request. The response may indicate completion of the requested activity, supply memory read data, error status, etc.

The term redundancy controller may mean a requesting protocol agent that acts on behalf of a central processing unit (CPU), input output (I/O) device, or other user of memory, and generates requests such as read and write requests to one or more responding protocol agents (e.g., media controllers). The redundancy controller may be the attachment point where producers or consumers of data attach to the fabric. The redundancy controller may communicate with multiple media controllers and may implement redundant storage of data across more than one media controller on behalf of a CPU, I/O device, etc., such that the failure of a subset of the media controllers will not result in loss of data or interruption of system operation. The term media controller may mean a responding protocol agent that connects memory or storage devices to a memory fabric. The media controller may receive requests such as read and write requests, control the memory or storage devices, and return corresponding responses. The media controller may be the attachment point where data storage attaches to the memory fabric.

The term command may mean a transaction sent from a processor, I/O device or other source to a redundancy controller, which causes the redundancy controller to issue a sequence. The term primitive may mean a single request issued by a redundancy controller to a media controller, and may include its corresponding response from the media controller back to the redundancy controller. The term sequence may mean an ordered set of primitives issued by a redundancy controller to one or more media controllers to execute a command received from a processor, I/O device or other source. The term locked sequence may mean a sequence that requires atomic access to multiple media controllers. The term cacheline may mean a unit of data that may be read from or written to a media controller by a redundancy controller. The term is not intended to be restrictive. The cacheline may include any type or size of data, such as a disk sector, a solid-state drive (SSD block), a RAID block or a processor cacheline. The term stripe may mean a set of one or more data cachelines, and associated redundancy information stored in one or more parity cachelines, which are distributed across multiple memory modules. The term RAID may mean a use of multiple media controllers each with its own memory devices, to store redundant data in a manner such that the failure of a single media controller or its memory devices will not result in loss of data, nor loss of access to data. Variations which tolerate the failure of a larger number of media controllers or memory devices are also covered by this term. The term single point of failure may mean an architecture in which the failure of a single redundancy controller can prevent the continued operation of other redundancy controllers, or continued accessibility of the data.

Disclosed herein are examples of systems and methods to protect system survivability and shared RAID data from corruption by failing memory module(s). Examples can guarantee integrity of the RAID-protected data even in the event of a failure or unplanned outage of one or more of the memory modules, non-volatile memory (NVM) devices, and/or media controllers. Examples enable fault tolerant memory fabric, which may include memory using RAID technology. Fault-tolerant memory fabric may allow multiple independent redundancy controllers to concurrently and asynchronously access a shared or otherwise aggregated pool of RAID storage, which may span across multiple media controllers.

FIG. 1 is a block diagram of a compute node 100 including a redundancy controller 110 according to an example. The compute node 100 also includes private memory 108, processor 102, and I/O interface 106. The various components may be coupled by a bus 105.

The compute node 100 (e.g., computing device, input/output (I/O) server node) may include additional components, and one or more of the components described herein may be removed and/or modified without departing from a scope of the compute node 100. In an example, the compute node 100 is a server, but other types of compute nodes may be used. The compute node 100 may be a node of a distributed data storage system. For example, the compute node 100 may be part of a cluster of nodes to service queries and provide data storage for multiple users or systems, and the nodes may communicate with each other to service queries and store data. The cluster of nodes may provide data redundancy to prevent data loss and minimize down time in case of a node failure.

The processor 102 may be a microprocessor, a microcontroller, an application specific integrated circuit (ASIC), field programmable gate array (FPGA), or other type of circuit to perform various processing functions. The private memory 108 may include volatile dynamic random access memory (DRAM) with or without battery backup, non-volatile phase change random access memory (PCRAM), spin transfer torque-magnetoresistive random access memory (STT-MRAM), resistive random access memory (reRAM), memristor, FLASH, or other types of memory devices. For example, the memory may be solid state, persistent, dense, fast memory. Fast memory can be memory having an access time similar to DRAM memory. The I/O interface 106 may include a hardware and/or a software interface. The I/O interface 106 may be a network interface connected to a network, such as the Internet, a local area network, etc. The compute node 100 may receive data and user-input through the I/O interface 106. Where examples herein describe redundancy controller behavior occurring in response to commands issued by the processor 102, this should not be taken restrictively. The examples are also applicable if such commands are issued by an I/O device via interface 106.

The components of computing node 100 may be coupled by a bus 105, where the bus 105 may be a communication system that transfers data between the various components of the computing device 100. In examples, the bus 105 may be a Peripheral Component Interconnect (PCI), Industry Standard Architecture (ISA), PCI-Express, HyperTransport®, NuBus, a proprietary bus, and the like. Alternatively, the processor 102 may use multiple different fabrics to communicate with the various components, such as PCIe for I/O, DDR3 for memory, and QPI for the redundancy controller.

The redundancy controller 110, for example, may act on behalf of the processor 102 and generate sequences of primitives such as read, write, swap, exclusive OR (XOR), lock, unlock, etc. as requests to one or more responding protocol agents (e.g., media controllers 120A-M as discussed further below with respect to FIG. 5). The redundancy controller 110 may communicate with multiple ones of the media controllers 120A-M, in which "M" represents an integer value greater than one, and may implement redundant storage of data across more than one media controller on behalf of the processor 102 such that the failure of a subset of the media controllers 120A-M will not result in loss of data or interruption of system operation. The redundancy controller 110, for example, may generate certain sequences of primitives independently, not directly resulting from processor commands. These include sequences used for scrubbing, initializing, migrating, or error-correcting memory.

Example redundancy controllers 110 may be part of a system where multiple compute nodes 100 form a complex system access shared data images stored with RAID redundancy on multiple memory controllers. Multiple redundancy controllers 110 may interact with example memory modules 104A-M (see FIG. 5), to detect that there has been a failure associated with at least one memory module. Examples may transition the redundancy controllers 110 into degraded mode in a coordinated manner, to avoid data corruption during the transition into degraded mode. Thus, examples enable the robust survival of compute nodes 100 in the event of memory failures.

Figure 2:
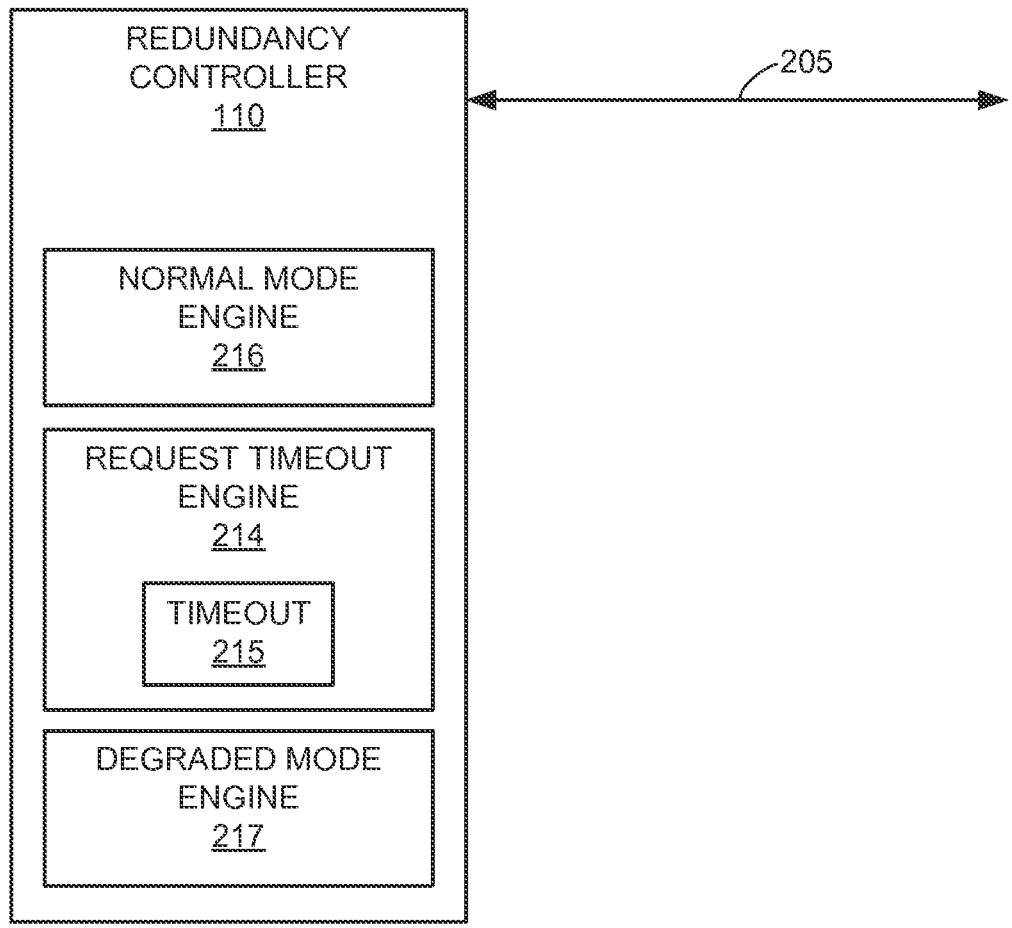
FIG. 2 is a block diagram of a redundancy controller including a normal mode engine, a request timeout engine, and a degraded mode engine according to an example.

FIG. 2 is a block diagram of a redundancy controller 110 including a normal mode engine 216, a request timeout engine 214, and a degraded mode engine 217 according to an example. The request timeout engine 214 is associated with at least one timeout 215. The redundancy controller 110 is shown coupled to a fabric 205. Although illustrated as separate blocks, in alternate examples, blocks may be provided by one or more engines having multiple modes of operation.

The normal mode engine 216 may be used to perform operations, such as issuing and receiving primitives. For example, the redundancy controller 110 may use the normal mode engine 216 to write to redundant data on multiple media controllers. The data may be stored on one or more of a plurality of media controllers, and the normal mode engine 216 also can write the associated parity for the data. Thus, the normal mode engine 216 may update the data and the parity to ensure they are consistent with each other such that the parity may be used (e.g., after a memory module fails) to reconstruct the data. Various other operations may be performed by the normal mode engine 216, as set forth in further detail below. For example, the redundancy controller 110 may use the normal mode engine 216 to lock access to a data stripe, update the data and update the parity, then unlock access to the data stripe.

The request timeout engine 214 may be used to identify if operations/primitives are not acted upon in a timely manner. For example, the redundancy controller 110 may include a timer that may be checked against a timeout 215. For a given outstanding request/primitive that has been issued by the redundancy controller 110, the request timeout engine 214 may wait for a response to return and use the timer to check how long the response takes to come back. If the response time exceeds a threshold time corresponding to the timeout 215, the request timeout engine 214 may identify that there is a problem with the given request/primitive associated with that given timeout 215. For example, a media controller to which the request was intended may have become inoperable/unresponsive in an abrupt and total way, such that a request to that media controller goes unanswered and exceeds its corresponding timeout 215. Accordingly, the request timeout engine 214 can identify such issues to inform the redundancy controller 110.

As set forth in further detail below, the request timeout engine 214 also may identify an issue with a media controller in response to receiving a containment mode indication from a media controller. Thus, the request timeout engine 214 may identify that degraded mode is to be entered even if a timeout is not expired.

Various outstanding primitive requests that the redundancy controller 110 sends to memory modules, such as reads, writes, locks, unlocks, etc., may be associated with corresponding timeouts 215 to check whether the primitive request has completed in a timely manner, relative to expected performance of the system for that primitive request. The request timeout engine 214 may keep track of such requests and corresponding timeouts 215, and identify that expiration of a given timeout may serve as an indication that a fault has occurred in the associated memory module. Thus, the request timeout engine 214 may identify even abrupt and total catastrophic failures of a memory module (and/or its memory controller) based on exceeding the timeout 215 in the absence of a response, without needing to receive a specific error response from the memory module.

Identifying expiration of a timeout 215, for a given primitive still outstanding to a given memory module, enables the redundancy controller 110 to disqualify that memory module, e.g., from further participation in RAID activity. As such, the redundancy controller 110 may operate according to a degraded mode (see further details below) for future accesses to, e.g., stripes (see FIG. 6) for which the timed-out memory controller provides data or parity storage. Thus, the request timeout engine 214 provides a technique of enabling the redundancy controller 110 to enter degraded mode.

The timeout 215 for a given request/primitive may be chosen as a function of the architecture of the system. For example, a given architecture may be associated with known times for how long it should take to receive responses to requests sent between a given source/destination, accommodating various delays in the network architecture (e.g., queuing delays and the like). Thus, a given component may be associated with a round trip time for the request sent from a redundancy controller to reach the media controller, for the media controller to access its memory, for the memory to return data, and for the response to return to the redundancy controller through the network. A tolerance may be added as well to the total network delay. Thus, the timeout 215 may be chosen accordingly, to identify an issue if the timeout 215 is exceeded.

The degraded mode engine 217 is to issue requests/primitives to the surviving memory controllers while the redundancy controller 110 is operating in degraded mode, e.g., implementing RAID degraded mode operation for continued operation with one or more failed memory modules that have been excluded from the RAID group. Thus, the degraded mode engine 217 can directly issue requests (such as memory access primitives) to, and receive responses from, surviving media controllers via the fabric 205/network, in accordance with degraded-mode RAID operation. Degraded mode allows continued access to RAID stripes for which one of the memory modules has failed, because data is stored redundantly across a plurality of memory modules. The redundancy controller may run in degraded mode by using a modified form of access where it no longer relies on all the memory modules. Data may be reconstructed from data and/or parity on surviving memory modules, for reads. For writes to data that would have been located on the failed memory module, systems in degraded mode may calculate what effect the write would have had on parity, and update the parity instead.

More specifically, in degraded mode, reads of data located on healthy memory modules proceed as normal. Writes to data located on healthy memory modules proceed as normal, except that the corresponding parity updates are skipped if the parity happens to reside on the failed memory module. Reads of data located on the failed memory module instead use parity-reconstruction to reconstruct the lost data from the data read from all the surviving memory modules serving the stripe. Because this is a multiple-memory-module sequence, this type of read sequence may be treated as a "locked sequence." Writes to data located on the failed memory module instead use parity-reconstruction as noted above, to reconstruct the lost pre-write data, and then may use that reconstructed data (e.g., in an XOR calculation) for the new parity value to be written to the healthy memory module that holds the stripe's parity. Because this is a multiple-memory-module sequence, this type of write sequence may be treated as a "locked sequence." Sequences that may be treated as a "locked sequence" also include healthy writes issued by the normal mode engine, as set forth above, and writes to data located on healthy modules, in cases where the parity also resides on a healthy module. Thus, degraded mode writes may be treated similarly to healthy writes, in cases where both the data and parity module for that particular write happen to be healthy.

Figure 3:
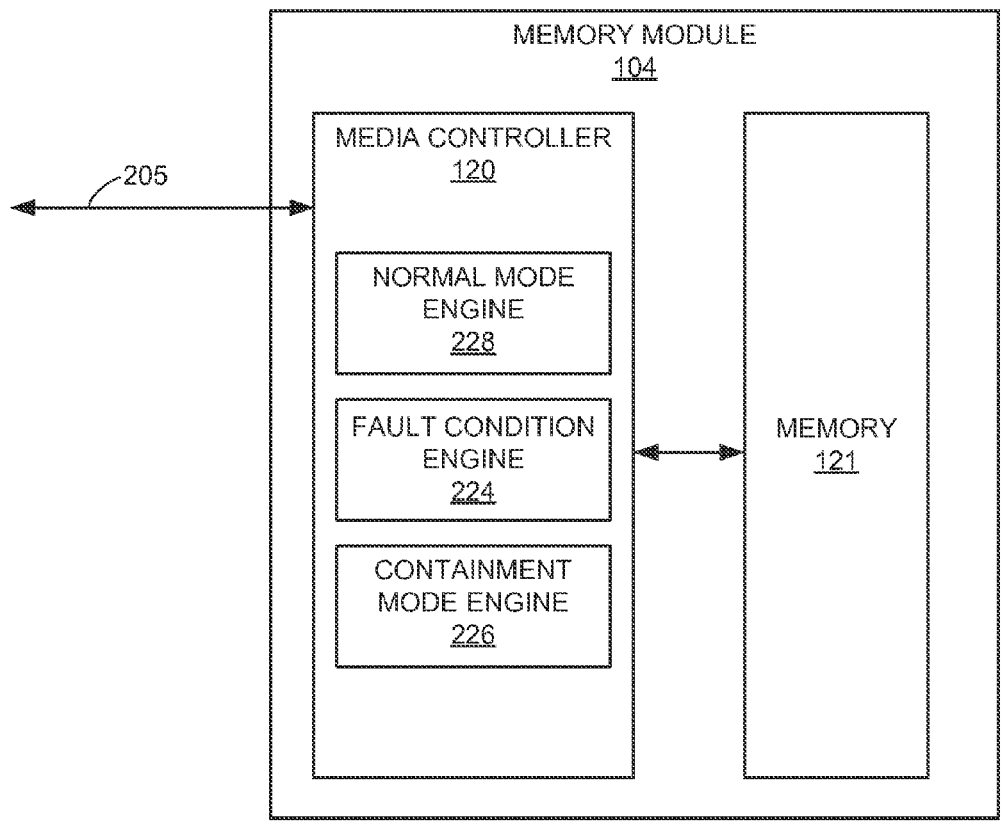
FIG. 3 is a block diagram of a memory module including a normal mode engine, a fault condition engine, and a containment mode engine according to an example.

FIG. 3 is a block diagram of a memory module 104 including a media controller 20 and a memory 121. The media controller 120 includes a normal mode engine 228, a fault condition engine 224, and a containment mode engine 226 according to an example. The memory module 104 is shown coupled to fabric 205. Although illustrated as separate blocks, in alternate examples, blocks may be provided by one or more engines having multiple modes of operation.

Generally, the memory module 104 includes logic such as media controller 120 to receive primitives/requests sent from a redundancy controller. Such logic also enables the memory module 104 to accesses memory devices of memory 121. The normal mode engine 228 may respond to primitives/requests (e.g., as set forth above with respect to the redundancy controller 110 of FIG. 2) sent by a redundancy controllers.

The fault condition engine 224 is to identify a fault with the media controller 120, e.g., identify whether the memory 121 (e.g., a NVM memory device) of the memory module 104 has failed. For example, the media controller 120 of the memory module 104 may detect a failure of the underlying memory 121, which the media controller 120 is unable to correct. However, the media controller 120 may still be alive and well and responding to requests from redundancy controllers, and thus able to indicate the fault condition via the fault condition engine 224. The fault condition engine 224 may identify other such errors, e.g., whether a problem has occurred with the fabric that connects the memory module's media controller to its memory. Thus, the fault condition engine 224 may identify modes of failure where the media controller of a memory module 104 is still alive/responding, but cannot protect against data loss, or cannot usefully proceed. Such capability (e.g., as provided in a media controller of the memory module 104) enables the media controller 120 to recuse itself (e.g., deliberately remove itself from service) based on detecting a failure mode which i) precludes the memory module 104 from further operation altogether, ii) precludes the memory module 104 from use in an address-specific manner, and/or iii) risks future intermittent or transient failure of the memory module 104.

In such a case where the media controller 120 has recused itself, the media controller 120 may continue to return responses to requests that it receives (e.g., via the containment mode engine 226, see below for further details). Such responses may be provided as containment mode indications, to inform redundancy controllers that a given request/primitive received from the redundancy controller has failed because the media controller 120 has gone into containment mode in response to the fault condition engine 224 having detected an earlier failure of the memory module 104.

The containment mode engine 226 may provide the containment mode indications in response to failures where the media controller 120 of the memory module 104 actively detects a fault. Examples of such a fault include, e.g., the existence of an uncorrectable pattern of NVM storage devices, on the memory 121 of the memory module 104, that have ceased to function. Once the media controller 120 has entered containment mode, it indicates so via the containment mode indication sent to the redundancy controller, for the current primitive, and all future primitives received. The containment mode indication may be used by the redundancy controller to trigger the redundancy controller to enter degraded mode.

The containment mode engine 226 may provide containment mode indications even if the detected mode of failure is one that would otherwise present itself as an intermittent, transient, or address-dependent failure. Such intermittent, transient, or address-dependent failures might otherwise (in the absence of the described example solutions) be observed by only a subset of the redundancy controllers using the memory module that has failed, leading to potential data corruption problems resulting from the concurrent use of "degraded mode" RAID by some redundancy controllers and not by others. Thus, the use of containment mode indications avoids such potential issues by enabling coordinated entry of the redundancy controllers into degraded mode.

The abrupt and persistent self-recusement, which is the deliberate result of entering "containment mode" upon detection of a failure mode that would otherwise as intermittent, transient, or address-dependent, may be referred to herein as fail/stop behavior. Such abruptness of entering containment mode in response to a failure helps to guarantee that various different redundancy controllers transition into degraded mode in a consistent manner, i.e., consistent with respect to the stream of primitives/requests that arrive at the failed memory module 104. Thus, if all the primitives arriving at a memory module 104 before a point in time succeed, and all the ones arriving at the memory module 104 after that point in time fail, then the redundancy controllers are able to transition to degraded mode in a coordinated manner. Note that memory and storage media controllers may implement techniques such as error-correcting code (ECC), location sparing, and the like to allow continued reliable operation of memory or storage in the presence of a limited number or constrained pattern of memory/storage device failures. However, self-recusement of a memory module may be applied in situations where even such ECC, location sparing, etc. techniques have failed to preserve reliable operation of the memory module 104 (e.g., if the number or pattern of memory device failures has exceeded the limits of such correction mechanisms).

The containment mode engine 226 may return the containment mode indication as a special response to a primitive request, such as a read, write, lock, or unlock, sent from a redundancy controller to the memory module 104. The containment mode indication can be returned to inform the redundancy controller that the memory module 104 has entered containment mode. The containment mode indication may be returned for primitive requests that the memory module 104 receives after the moment in time when the memory module 104 enters containment mode. Thus, redundancy controllers will learn of the memory module 104 failure before (or during) subsequent attempts to write data to storage on the failed memory module 104. This mechanism thus guarantees that all future storage writes that would have written RAID data or parity to the failed memory module, instead perform degraded mode writes to the remainder of the stripe, which comprises healthy memory modules.

Thus, containment mode is enabled by the example memory modules 104 described herein, to identify and communicate even modes of failure that are in some way subtle, e.g., modes that are intermittent, that affect only certain parts/addresses of the memory and not others, or that cause the memory to appear to be working but writes are not committed to memory, and so on. Containment mode thereby prevents a failing memory module 104 from exposing redundancy controllers to such partial modes of failure, by cleanly recusing the memory module 104 from further service, and ensuring a coordinated entry into degraded mode.

Figure 4:
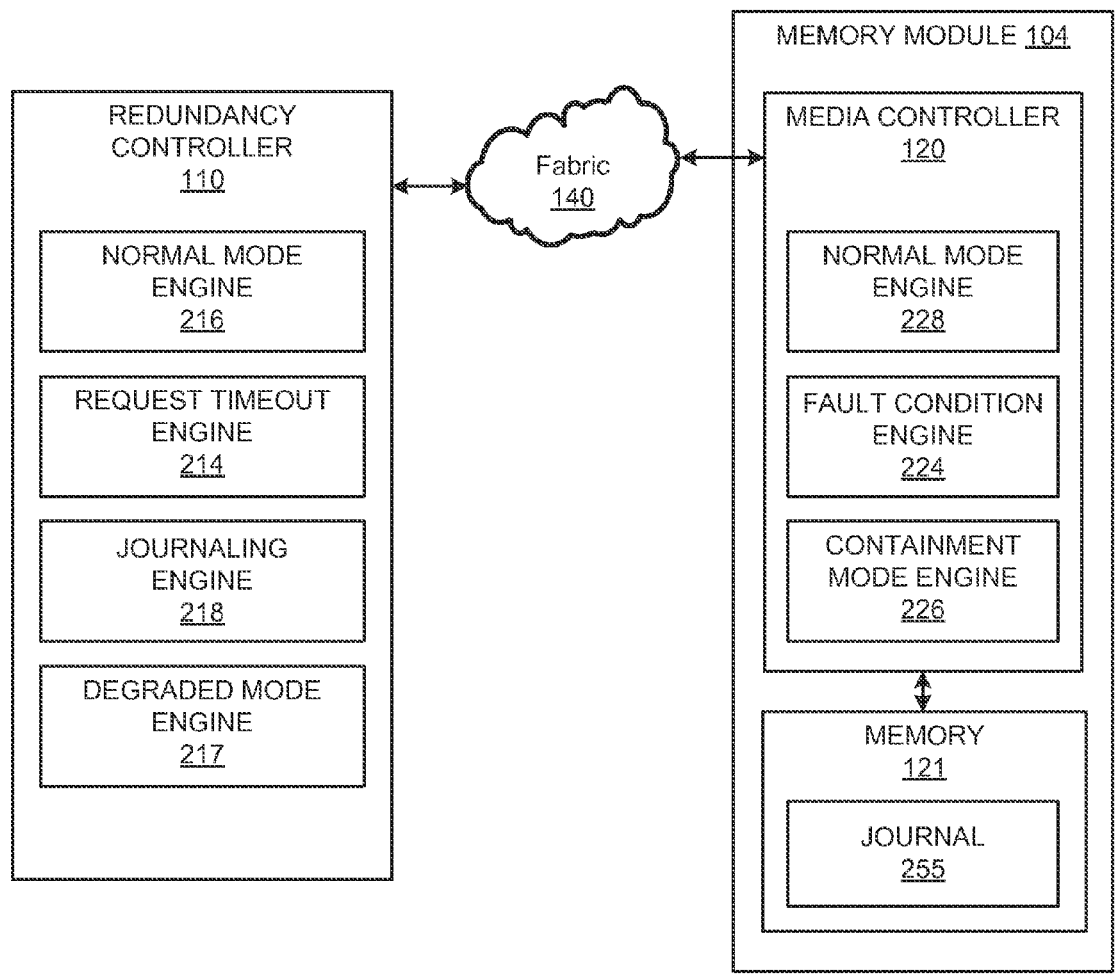
FIG. 4 is a block diagram of a system including a redundancy controller and a memory module according to an example.

FIG. 4 is a block diagram of a system including a redundancy controller 110 and a media controller 120 according to an example. The redundancy controller 110 includes a normal mode engine 216, a request timeout engine 214, a journaling engine 218, and a degraded mode engine 217. The media controller 120 includes a normal mode engine 228, a fault condition engine 224 and a containment mode engine 226, and is coupled to a journal 255. The redundancy controller 110 and the media controller 120 are coupled to fabric 140. Although illustrated as separate blocks, in alternate examples, blocks may be provided by one or more engines having multiple modes of operation. The redundancy controller 110 and media controller 120 can exchange information, such as requests and responses, over the fabric 140.

The normal mode engine 216 of the redundancy controller 110 may be used by the redundancy controller 110 regarding primitives/requests etc., until a fault in the memory module 104 is detected. In response, the redundancy controller 110 may journal the failure via journaling engine 218, and switch to using the degraded mode engine 217 regarding primitives/requests. The normal mode engine 216 can receive containment mode indications from the media controller 120. Primitive requests of the redundancy controller 110 may be sent from the normal mode engine 216, as well as from the degraded mode engine 217 (e.g., depending upon the mode in which the redundancy controller 110 is operating).

The redundancy controller 110 also may enter degraded mode in response to the request timeout engine 214 identifying that a primitive's request has been outstanding for a time exceeding a threshold timeout. Thus, the request timeout engine 214 may keep track of a plurality of timeouts corresponding to a respective plurality of primitives.

The journaling engine 218 is to provide a journaling mechanism for the redundancy controller 110. The redundancy controller 110, upon identifying that the memory module 104 has failed (e.g., via the timeout mechanism or receiving a containment mode indication) may use the journaling engine 218 to synchronously and persistently record such information in a journal 255 (e.g., located in memory 121), to create a record of the failure event. The journal 255 may be stored redundantly, e.g., on a plurality of memory modules 104. Each of a plurality of redundancy controllers 110, upon identifying the failure of a memory module 104 (whether via receiving a containment mode indication or timeout), can record the failure in journal(s) 255.

The journal 255 of the memory module 104 may therefore indicate which memory modules 104 that are failed, e.g., whose data is becoming stale due to lack of receiving updates. Thus, if such a memory module 104 were to recover (e.g., following an intermittent failure), its data would now be stale data that is missing recent writes. Thus, the redundancy controller 110 may record, in the journal 255 that is persistent (i.e., the journal 255 is to survive a reboot) on the memory module 104 (or elsewhere, see below), the imminent removal of a media controller/memory module 104 from a RAID group.

The journal 255 may be stored on a section of persistent memory, such as a region of NVM memory 121 of the memory module 104 (see journals 255A . . . M of FIG. 5). The journal 255 also may be stored elsewhere, e.g., attached to or inside the media controllers 120 of the memory modules 104, attached to or inside the redundancy controllers 110, and elsewhere. The journal 255 may be accessed normally, e.g., using read and write primitives across the fabric 140. The journal 255 may be replicated as copies across a plurality of memory modules 104. The journal 255 can include journal entries to protect the integrity of stored data. In some examples, the journal 255 may be stored so that it is not separable from the data that it protects in the memory module 104, e.g., physically storing the journal 255 on the same media as the data in the memory module 104 (e.g., on a journal region of the memory). Journal writes may be performed similar to how normal memory write primitives are performed, passed through the fabric 140 and handled by the normal mode engine 228 in surviving media controllers 120 of memory modules 104. The journal 255 is to be written by the redundancy controller 110, and the journal 255 may be replicated on NVM homed on a multiplicity of memory modules 104 (and thus attached via a multiplicity of media controllers corresponding to the memory modules 104).

Journaling may be performed according to a convention where, before a RAID grouping of memory modules 104 is mounted, the corresponding journals 255 are examined (e.g., by journaling engines 218). If journal entries are found indicating that a redundancy controller 110 entered degraded mode as a result of detecting a failure of a memory module 104, then the RAID grouping is to be mounted directly in degraded mode. Thus, example systems may be shut off/powered down, and later turned on/powered up, and properly enter degraded mode as appropriate based on the journals 255. For example, system software or firmware etc., used to bring the system up, can go look at the journal(s) 255 and identify whether a given memory module 104 was previously reported as failed. If so, the system can identify the RAID groups which were relying on the failed memory module 104 and are now in degraded mode, and bring the system up in degraded mode to continue running in the same state it was prior to being shut off. The degraded mode engine 217 may be used to issue degraded mode accesses to the (surviving) memory modules 104, after a memory module 104 fails and degraded mode is active.

It is noted that degraded mode behavior should not be co-mingled with normal (non-degraded mode) behavior, within a single RAID group or RAID stripe. For example, a degraded mode write where the data resides on a failed memory module 104, and the parity resides on a healthy memory module 104, would result in updated parity only. A subsequent non-degraded mode read of that same address would consume the data from the failed memory module, even though it is now stale with respect to the write. This illustrates a distinction with the example multiple redundancy controllers 110 described herein, in contrast to other single-controller RAID solutions having a single point of synchronization of entry into degraded mode. With multiple redundancy controllers acting independently, co-mingling degraded and non-degraded operations becomes a concern. Examples described herein avoid such co-mingling data corruption issues, through use of containment mode indications to inform redundancy controllers 110 and effectively synchronize degraded mode entry across a plurality of redundancy controllers 110 (from the perspective of the stream of primitives that might modify data or parity stored on that memory controller of memory module 104).

It should also be noted that when the mode of failure of a memory module 104 is abrupt and total (e.g., based on use of timeout mechanism described with respect to the request timeout engine 214), degraded mode entry is still effectively synchronized between a plurality of redundancy controllers 110, because an abrupt and total failure is in effect "fail/stop" behavior, thereby preventing degraded and non-degraded operations from co-mingling in a harmful manner. Furthermore, data corruption risks associated with co-mingling degraded-mode and non-degraded-mode accesses are applicable if non-degraded-mode accesses occurs after the degraded mode. Thus, examples described herein use journaling to avoid such risks and guarantee that prior degraded-mode entry events are not forgotten for a RAID grouping, e.g. if it is mounted afresh, following a system power down or power-failure. Data corruption is avoided even if, for example, the memory module failure mode was intermittent and did not happen to be obviously evident upon subsequent mounting of the RAID grouping.

In some examples, the containment mode engine 226 of the media controller 120 may send containment mode indications in response to the plurality of primitive requests received from all redundancy controllers subsequent to the moment in time when the fault is detected. Such abrupt and consistent nature of the resulting coordinated change in behavior affecting all redundancy controllers similarly, enables containment to be very effective, because all redundancy controllers are able to enter their degraded modes at the same point within the comingled stream of operations. Thus, such examples may avoid inconsistency between redundancy controllers 110 with respect to their entry into degraded mode, preventing potential sources of data corruption.

RAID groupings can be rebuilt once the failed memory module 104 has been repaired/replaced, with each stripe being independently rebuilt to fill-in the correct missing data onto the replaced memory module 104. However, for multiple-redundancy-controller storage systems (e.g., as shown in FIG. 5), the rebuilding sequence for each stripe is to be treated as a locked sequence. Upon completion of the rebuild for the affected stripes, the journal entries indicating memory module failure may be removed, to avoid unnecessarily re-entering degraded mode upon subsequent mounting of the RAID grouping.

Figure 5:
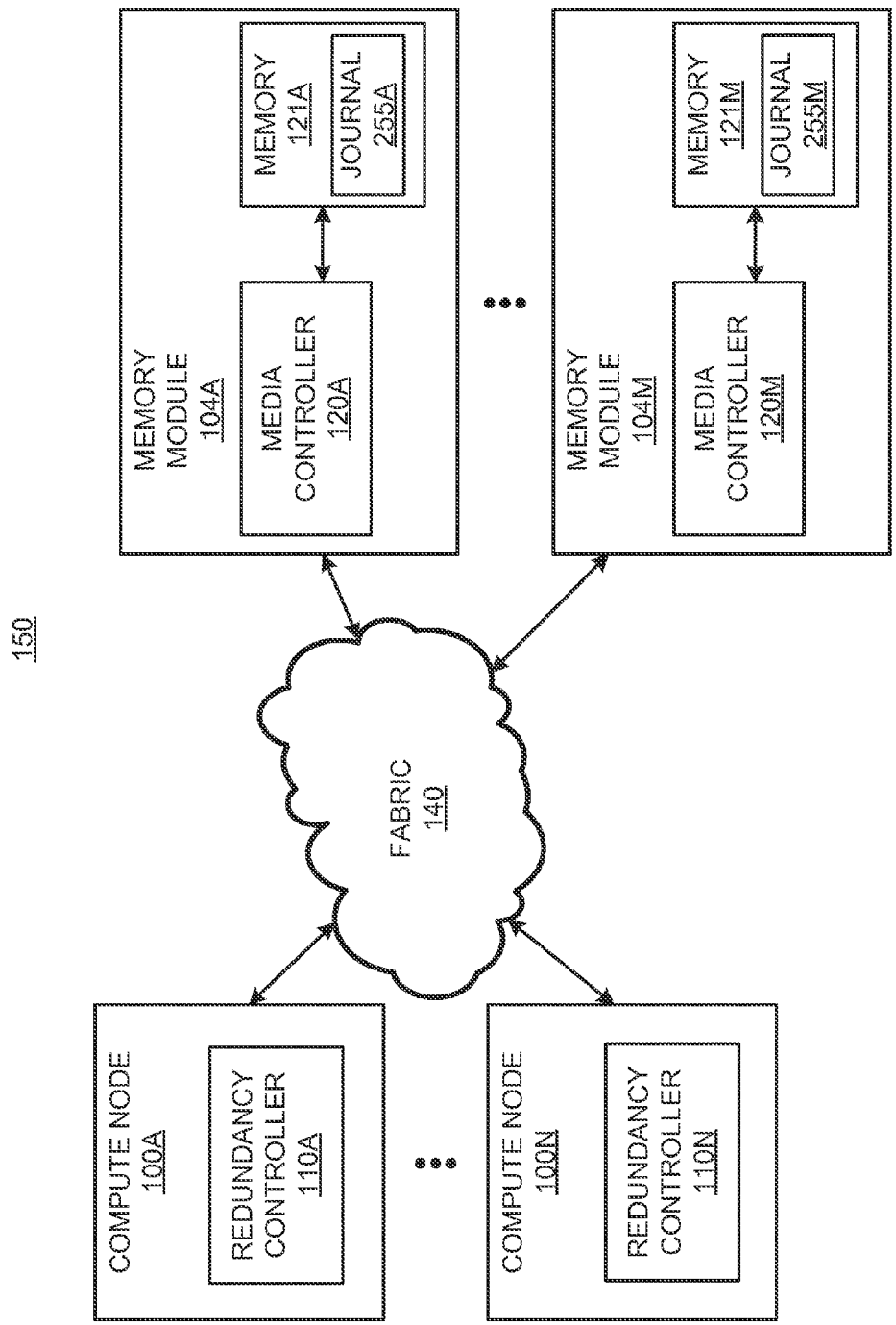
FIG. 5 is a block diagram of a system including a plurality of compute nodes and a plurality of memory modules according to an example.

FIG. 5 is a block diagram of a system 150 including a plurality of compute nodes 100A-100N and a plurality of memory modules 104A-104M according to an example. The compute nodes 100A-100N are coupled to fabric 140, and include respective redundancy controllers 110A-110N. The memory modules 104A-104M are coupled to fabric 140, and include respective media controllers 120A-120M and memories 121A-121M. The memories 121A-121M include respective journals 255A-255M. It should be understood that the system 150 may include additional components and that one or more of the components described herein may be removed and/or modified without departing from a scope of the system 150.

The multiple compute nodes 100A-N may be coupled to the memory modules 104A-M through the fabric 140. The memory modules 104A-M may include media controllers 120A-M and memories 121A-M. Each media controller, for instance, may communicate with its associated memory and control access to the memory by the redundancy controllers 110A-N, which in turn are acting on behalf of the processors. The media controllers 120A-M provide access to regions of memory. The regions of memory are accessed by multiple redundancy controllers in the compute nodes 100A-N using access primitives such as read, write, lock, unlock, swap, XOR, etc. In order to support aggregation or sharing of memory, media controllers 120A-M may be accessed by multiple redundancy controllers (e.g., acting on behalf of multiple servers). Thus, there is a many-to-many relationship between redundancy controllers and media controllers. Each of the memories 121A-M may include volatile dynamic random access memory (DRAM) with battery backup, non-volatile phase change random access memory (PCRAM), spin transfer torque-magnetoresistive random access memory (STT-MRAM), resistive random access memory (reRAM), memristor, FLASH, or other types of memory devices. For example, the memory may be solid state, persistent, dense, fast memory. Fast memory can be memory having an access time similar to DRAM memory.

As described in the disclosed examples, the redundancy controllers 110A-N may maintain fault tolerance across the memory modules 104A-M. The redundancy controller 110 may receive commands from one or more processors 102, I/O devices, or other sources. In response to receipt of these commands, the redundancy controller 110 generates sequences of primitive accesses to multiple media controllers 120A-M. The redundancy controller 110 may also generate certain sequences of primitives independently, not directly resulting from processor commands. These include sequences used for scrubbing, initializing, migrating, or error-correcting memory. The media controllers 120A-M may then respond to the requested primitives with a completion message.

RAID stripe locks acquired and released by the redundancy controller 110 guarantee atomicity for locked sequences. Accordingly, the shortened terms "stripe" and "stripe lock" have been used throughout the text to describe RAID stripes and locks on RAID stripes, respectively. For any given stripe, actual manipulation of the locks, including request queuing, lock ownership tracking, granting, releasing, and breaking, may be managed by the media controller that stores the parity cacheline for the stripe. Locking and unlocking is coordinated between the redundancy controllers and the relevant media controllers using lock and unlock primitives, which include lock and unlock request and completion messages. Media controllers 120A-M implement lock semantics on a per-cacheline address basis. Cachelines that represent stripe parity storage receive lock and unlock primitives from redundancy controllers, while those that represent data storage do not receive lock and unlock primitives. By associating locks with cacheline addresses, media controllers 120A-M may participate in the locking protocol without requiring explicit knowledge about the stripe layouts implemented by the redundancy controllers. Where the term "stripe lock" is used herein in the context of media controller operation, this should not be taken to imply any knowledge by the media controller of stripe layout. Media controllers 120A-M may identify requests to a locked stripe by address only, without regard to the stripe layout.

The plurality of journals 255A-M enable entry into degraded mode in a coordinated, journaled, manner, even in system 150 that has multiple redundancy controllers communicating with shared media controllers 120A-M of memory modules 104A-M. The persistent journal 255 can be stored in a reserved area of NVM storage, replicated on each of multiple memory modules 104A-M participating in RAID groupings accessed by the redundancy controllers 110A-N. As illustrated, a portion of memory 121A-M is reserved for storing the journals 255A-M. Redundancy controllers 110A-N can store the copy of the journal in the plurality of memory modules 104A. Storing the journals in more than one place enables robustness of redundant copies in surviving memory modules 104A-M. The redundancy controllers 110A-N can choose the destination (e.g., replicated across a multiplicity of memory modules 104A-M), choose the time (synchronously after detecting a media controller failure but before entering containment mode), and define the journal's content (a record of which memory modules 104A-M have failed). Journal entries are accessible by the redundancy controllers 110A-N using the same read and write primitives that are used for RAID data accesses. However, the need for locked sequences of primitives is not present for journal accesses, based on the journal layout being designed to avoid a need for atomic access methods. Thus, simple replication of storage may be used for journal accesses, operable even if some memory modules have failed. The replication of the journal 255 ensures that at least one copy will continue to remain accessible even after a memory controller has failed. In effect, journal replication provides redundancy protection for journal metadata, similar to the way RAID itself provides redundancy protection for the stored data.

In examples, the journal may be replicated across memory on surviving memory controllers. Thus, a journal 255A-M present on a surviving memory module 104A-M can record the health of the other memory modules 104A-M in the RAID group. Different RAID groups may depend upon different subsets of memory modules 104A-M. When re-mounting the RAID groups, journals on surviving memory modules 104A-M may be examined when determining which RAID groups may be started in normal mode, and which in degraded mode. A RAID group may be started in normal mode if its complete set of memory modules is healthy, and may be started in degraded mode if its set of healthy memory modules is incomplete.

Co-locating multiple copies of a given journal 255 on the same memory modules 104 which make up the RAID group to which it pertains, can guarantee that the journal metadata relating to the state of the stored data cannot be accidentally separated from that data, as might otherwise occur if, for example, the metadata were stored in the redundancy controllers themselves. Thus, in a modular computer system where memory controllers can be unplugged and/or rearranged, the data of the memory modules and the metadata of the applicable journal are not separable when a set of memory controller modules are moved from one system to another, avoiding risk of data corruption. Furthermore, the use of synchronous journal writes by the redundancy controllers 110A-110N prevents risk of data corruption. By synchronous, it is meant that journal updates relating to a redundancy controller detecting a given memory module's failure, are to be completed to persistent storage before beginning degraded-mode accesses to affected stripes. The use of synchronous writes guarantees that even in the event of unexpected interruption of operation, such as a power failure, the persistent journal is guaranteed to contain a record of the failure, if any degraded mode writes have occurred. Without this precaution, a power failure could leave data in a state where degraded mode has already affected stored data or parity, yet no record exists of entry into degraded mode (risking data corruption).

An example operation of the system 150 is described as follows. The redundancy controller 110A issues, e.g., a read to media controller 120A. Due to a complete or partial failure of the memory module 104A, either the read timed-out, or the media controller 120A sent back a response including a containment mode indication. In response, the redundancy controller 110A identifies that it needs to take that RAID group into degraded mode. Before going into degraded mode or attempting to do any degraded mode activity, the redundancy controller 110A writes to the journals 255A-M (the journals being replicated across the memories 121A-M), and waits for those writes to complete. After the journal writes have succeeded, the redundancy controller 110A continues with its operation, and identifies the write that had failed in normal mode. The redundancy controller 110A switches to degraded mode, and repeats the identified write in degraded mode, and carries on processing subsequent reads and writes in degraded mode. Such synchronous journaling guarantees that no matter if or when the system 150 goes down, (e.g., when power fails etc.) no degraded mode writes have occurred to the media until the journal already records that degraded mode writes will be performed, avoiding a race condition. When the system 150 is turned back on, it can examine the journals 255A-M to identify what state the system 150 was in at the time it was shut off. Accordingly, the system can set up the various RAID groups and bring them directly into a consistent state according to the journals, i.e., the redundancy groups that were in degraded mode can remain in degraded mode in the same manner as before with the same assumptions as to which media controllers 120A-M are working and which are not.

The journal information provides a record of the state of the data stored in the memory 121A-M. For example, if a RAID group suffered from the failure of media controller 120A, then the journal information stored on memories 121B-M will indicate that the data stored on 120A is stale and cannot be relied upon, and instead the data used on memories 121B-M is to be relied upon (e.g., to reconstruct the data). Multiple copies of the journals 255A-M enables survival (assuming the RAID is compatible) of multiple failures of media controllers 120A-M, while still having known surviving copies of the journals 255A-M. Furthermore, storing a copy on a plurality of memory modules 104A-M that participate in the RAID group guarantees that no matter how the memory modules 104A-M are unplugged-rearranged-plugged, a copy of the journal will be available to infer whether the module was accessed in degraded mode.

Thus, examples enable a distributed system 150, including a scalable switch fabric connecting multiple media controllers 120A-M to multiple redundancy controllers 110A-N. The plurality of redundancy controllers 110A-N may act concurrently and independently upon data RAID-striped across many media controllers 120A-M. Thus, system 150 includes multiple independent producers/consumers of data, and stands in contrast to monolithic (i.e., not distributed) storage subsystems where redundancy control is centralized in a single point. Each redundancy controller 110A-N may act concurrently and independently to serve a different stream of accesses on behalf of a different producer/consumer of data, distributed across a switched fabric fabric 140. A redundancy controller 110A-N may be co-located with and acting independently on behalf of its server. Thus, each server may have its own RAID controller which is part of its own failure domain. This avoids a need for coordination between different redundancy controllers 110A-N, which may use locks on the media controllers instead to coordinate any synchronous activity, allowing the system 150 to scale to large numbers of controllers without creating single-points of failure affecting multiple controllers (in contrast to other, e.g., single-controller RAID implementations).

Figure 6:
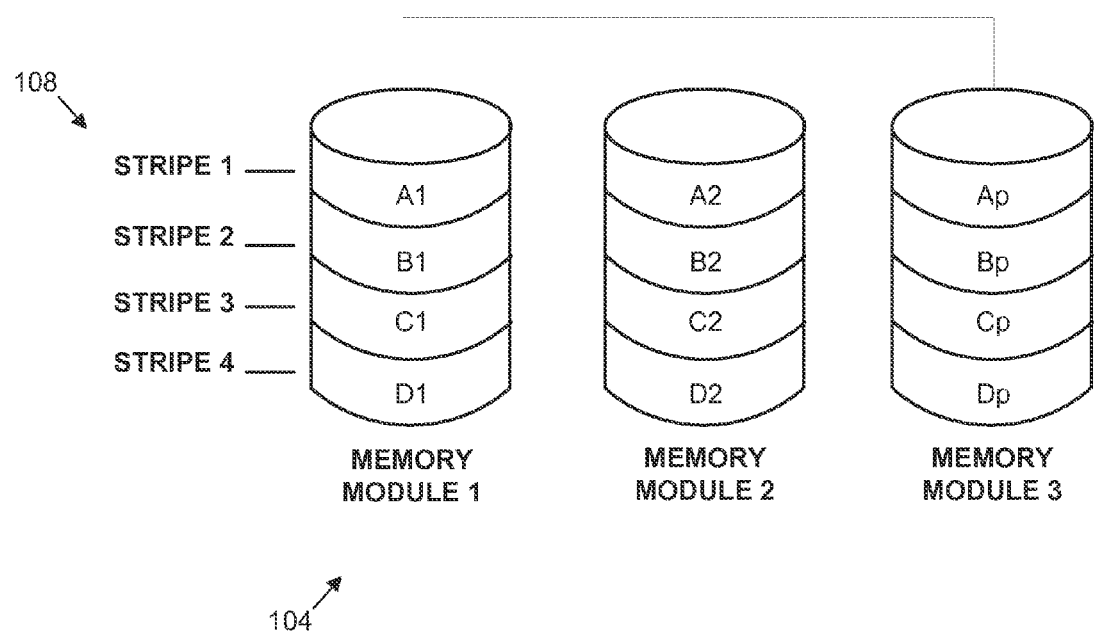
FIG. 6 is a block diagram of a plurality of RAID stripes across a plurality of memory modules according to an example.

FIG. 6 is a block diagram of a plurality of RAID stripes 108 across a plurality of memory modules 104 according to an example. The fault tolerant scheme of the disclosed examples may use memory associated with multiple memory modules (memory module 1, memory module 2, and memory module 3) to store RAID blocks A1-Dp, in which "p" represents an integer value greater than one. According to this example, each RAID block may include a single cacheline. A cacheline is the largest unit of data that can be atomically read or written to a memory module. A cacheline can be of any size used by processors, such as 64 bytes. The use of a single cacheline RAID block size should not be taken restrictively. Cachelines A1, A2, B1, B2, C1, C2, D1, and D2 represent data cachelines that are distributed across memory module 1 and memory module 2. Cachelines Ap, Bp, Cp, and Dp represent parity cachelines that are stored in memory module 3. The parity cachelines provide redundancy for the data cachelines.

A stripe 108 may include a combination of data cachelines from at least one memory module and parity cachelines from at least one other memory module. In other words, a stripe may include memory blocks distributed across multiple memory modules 104 that contain redundant information, and are to be atomically accessed to maintain the consistency of the redundant information. For example, one stripe may include cachelines A1, A2, and Ap (stripe 1), another stripe may include cachelines B1, B2, and Bp (stripe 2), another stripe may include cachelines C1, C2, and Cp (stripe 3), and another stripe may include cachelines D1, D2, and Dp (stripe 4). The data cachelines in a stripe may or may not be sequential in the address space of the processor 102. A RAID memory group may include stripes 1-4. The example in FIG. 6 represents a RAID-4 configuration, where parity cachelines are stored on a single memory module. Other RAID configurations, such as RAID-1 where the parity cachelines are mirrors of the data cachelines, and RAID-5 where parity cachelines are distributed across the plurality of memory modules, and other redundancy schemes are also covered by the present disclosure.

According to this example, if memory module 1 fails, the data cachelines from memory module 2 may be combined with the corresponding-stripe parity cachelines from memory module 3 (e.g., using the Boolean exclusive-OR (XOR) function) to reconstruct the missing cachelines. For instance, if memory module 1 fails, then stripe 1 may be reconstructed by performing an exclusive- or function on data cacheline A2 and parity cacheline Ap to determine data cacheline A1. In addition, the other stripes may be reconstructed in a similar manner using the fault tolerant scheme of this example. In general, a cacheline on a single failed memory module may be reconstructed by using the exclusive- or function on the corresponding-stripe cachelines on all of the surviving memory modules. The use of the simple exclusive- or operation in the reconstruction of missing data should not be taken restrictively. Different data-recovery operations may involve different mathematical techniques. For example, RAID-6 commonly uses Reed-Solomon codes.

Thus, examples described herein may operate in degraded mode, whereby data can be reconstructed by reading from less than all three of the memory modules 104. For example, if a memory module 104 fails, degraded mode may be performed by redundancy controllers on the surviving parts of the stripe (surviving memory modules 140) in order to reconstruct the data portion that went missing because of a failed memory module 104.

Figure 7:
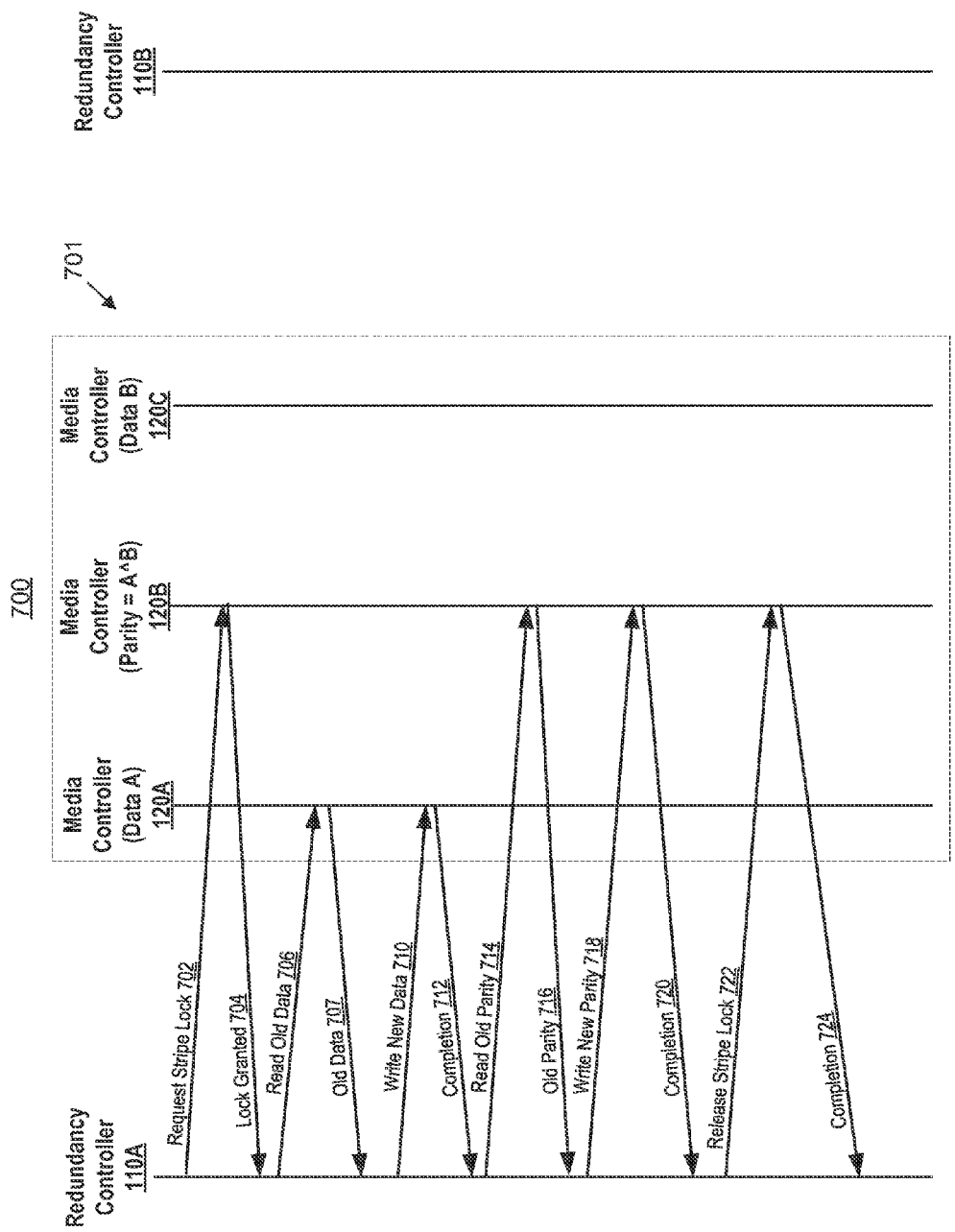
FIG. 7 is a bounce diagram of a redundancy controller illustrating a normal write operation without error according to an example.

FIG. 7 is a bounce diagram 700 of a redundancy controller 110A illustrating a normal write operation (performed without a failure/error) according to an example. Redundancy controllers 110A,B and media controllers 120A-C are depicted in FIG. 7. Redundancy controllers 110A-B may access a stripe 701 that includes data cachelines stored in first and second memory modules (corresponding to media controllers 120A,C) and a parity cacheline stored in the third memory module (corresponding to media controller 120B).

The sequence illustrated in FIG. 7 may begin the write operation based on the redundancy controller 110A sending, at arc 702, a request to obtain a stripe lock from the media controller 120B that hosts the parity cacheline. At arc 704, media controller 120B has determined that the stripe is not already locked and grants the lock to redundancy controller 110A. At arc 706, the redundancy controller 110A may read the old data, obtained at arc 707. At arc 710 the redundancy controller 110A writes the new data to the media controller 120, and receives a completion indication at art 712. At arc 714, the redundancy controller 110 reads the old parity value from the media controller 120B, receiving the old parity at arc 716. At arc 718, the redundancy controller 110A writes new parity to the media controller 120B, receiving a completion indication at arc 720. At arc 722, the redundancy controller 110A requests to release the stripe lock, receiving a completion indication at arc 724. The individual operations illustrated in FIG. 7 (and in other bounce diagrams) are primitives, such as acquiring a lock, performing a read of an individual media controller, performing a write to an individual media controller, releasing the lock, etc. A primitive can therefore include sending a request from the redundancy controller 110A to the media controller(s), as well as getting back a response. Notably, FIG. 7 illustrates that the normal write occurs without error in view of the media controllers 120A-C remaining operable without failing. Thus, the media controllers 120A-C provide responses that are not containment mode indications, within a time period that is less than their corresponding timeouts. This and all subsequent sequences depict RAID sequences composed of simple lock, unlock read and write primitives. These sequences could benefit from further optimization by the use of more sophisticated primitive operations. For example, combining locking with reading within a single primitive, or unlocking with writing, or reading with writing in SWAP and XOR operations. These depictions using only simple primitives are intended to illustrate the concepts of this invention in the clearest possible way, and should not be taken restrictively.

Figure 8:
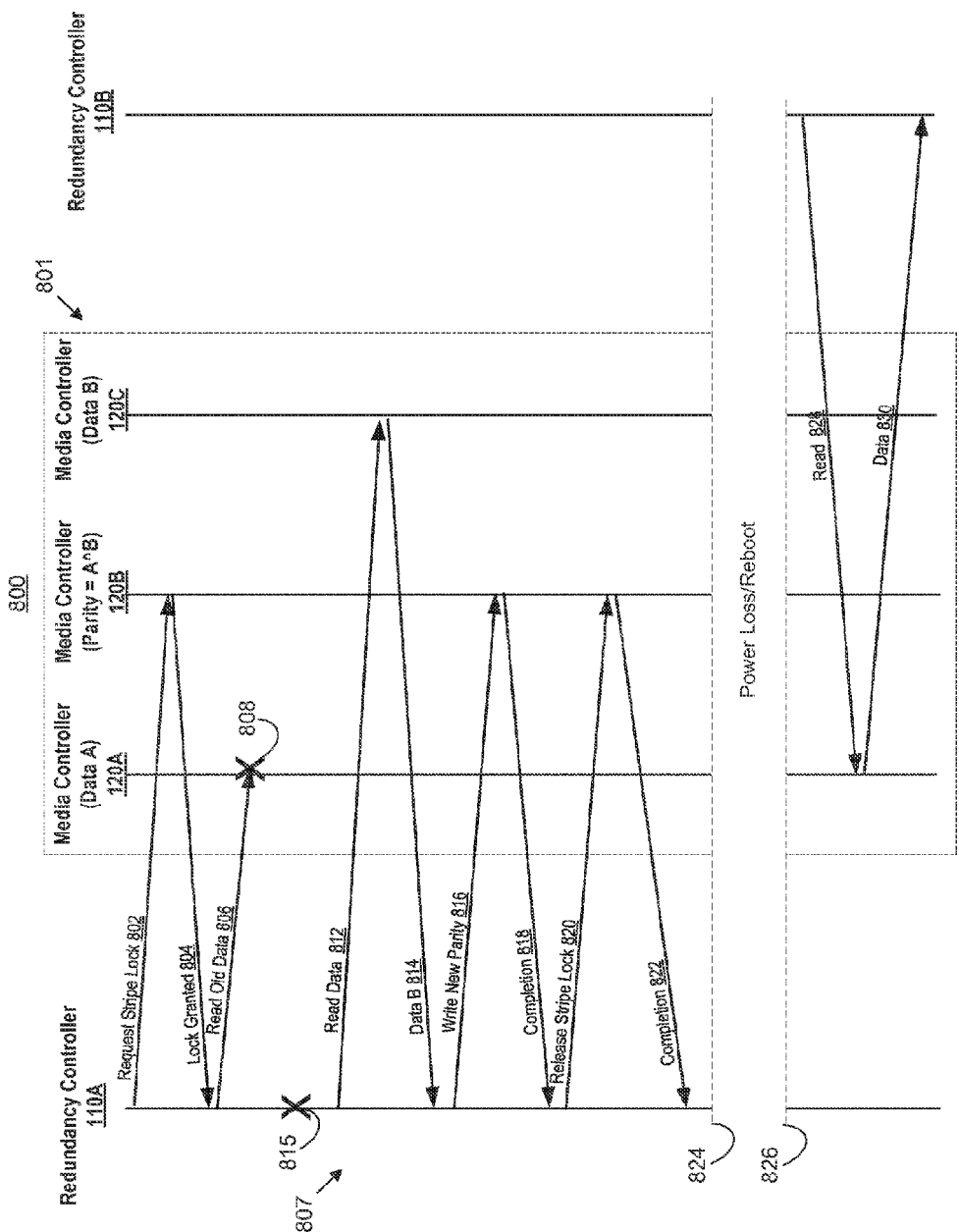
FIG. 8 is a bounce diagram of a redundancy controller illustrating a media controller failure, timeout, and degraded mode write operation according to an example.

FIG. 8 is a bounce diagram 800 of a redundancy controller 110A illustrating a media controller failure 808, timeout 815, and degraded mode write operation 807 according to an example. FIG. 8 also illustrates an example hazard of obtaining stale data as a result of a reboot following a degraded mode write. The sequence illustrated in FIG. 8 may begin a write operation (intended for media controller 120A) based on the redundancy controller 110A sending, at arc 802, a request to obtain a stripe lock from the media controller 120B that hosts the parity cacheline. At arc 804, media controller 120B has determined that the stripe is not already locked and grants the lock to redundancy controller 110A. At arc 806, the redundancy controller 110A attempts to read the old data. However, the media controller 120A experiences a media controller failure 808, wherein the media controller 120A does not send any response to arc 806. For example, the media controller 120A has catastrophically failed and is unable to send a containment mode indication or normal response. Meanwhile, the redundancy controller 110A has been timing how long until receiving a response to arc 806. For example, based on a request timeout engine 214 and timeout 215 as illustrated in FIG. 2. Thus, timeout 815 occurs, due to the redundancy controller 110A failing to receive a response before expiration of the timeout associated with a read request to media controller 120A. The redundancy controller 110A therefore enters RAID degraded mode based on the timeout 815, effectively ignoring the media controller 120A whose data will now become progressively stale over time.

However, the write operation of FIG. 8 was initially intended for the media controller 120A, which is now being effectively ignored. Thus, RAID degraded mode will be used to effectively perform that write, by performing other operations for each write intended for failed media controller 120A, instead of directly writing to failed media controller 120A. Accordingly, in arcs 812, 814, the redundancy controller 110A reads data B from media controller 120C. The redundancy controller 110A computes new parity, e.g., new parity=new data for data A^data B (where data A represents the data that would have been on media controller 120A, and the symbol "^" represents XOR). Other data calculations may be performed (e.g., calculating new data based on existing data and parity; see arcs 1042-1048 of FIG. 10). At arc 816, the redundancy controller 110A writes new parity to media controller 120B, receiving a completion indication at arc 818. The redundancy controller 110A then requests and is granted completion of releasing the stripe lock via arcs 820, 822. Next, at numeral 824, the system loses power (planned or unplanned).

The system is rebooted at numeral 826 (whereby media controller 120A is now appearing to be healthy, the prior failure having been intermittent). However, this illustrates a hazard, whereby the system was brought up without operating redundancy controller 110B (which is going to attempt to read data from media controller 120A) in degraded mode by treating the media controller 120A as having stale data. Accordingly, the redundancy controller 110B is able to read/receive stale data, via arcs 830, 832, because redundancy controller 110A had earlier performed a write (originally intended for media controller 120A) in degraded mode, whereby the new parity was written to media controller 120B instead. Such a hazard and undesirable result can be avoided by using the example journaling techniques described above and as illustrated in FIG. 10.

Figure 9:
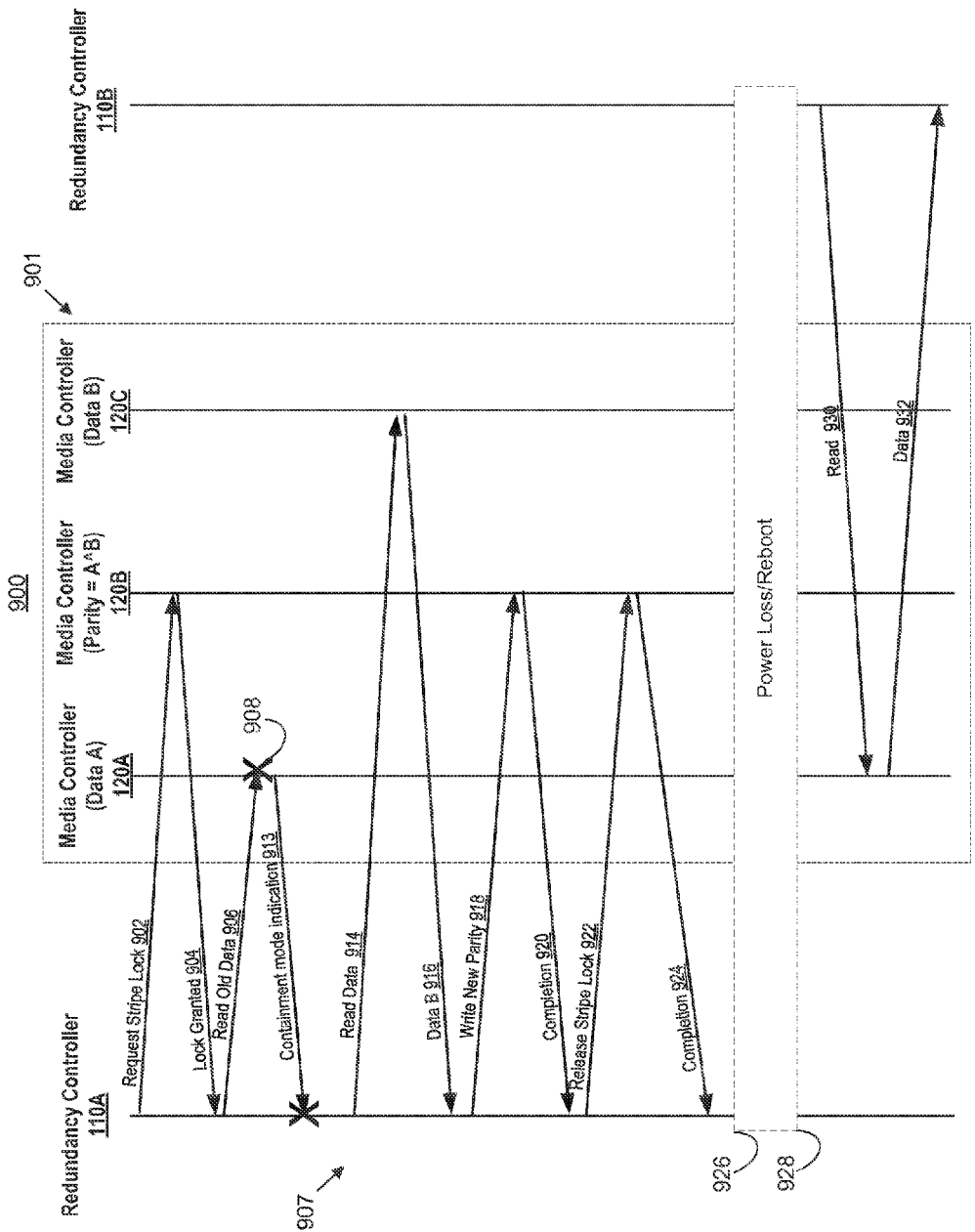
FIG. 9 is a bounce diagram of a redundancy controller illustrating a media controller failure, containment mode indication, and degraded mode write operation according to an example.

FIG. 9 is a bounce diagram 900 of a redundancy controller 110A illustrating a media controller failure 908, containment mode indication 913, and degraded mode write operation 907 according to an example. FIG. 9 illustrates another example hazard of obtaining stale data as a result of a reboot following a degraded mode write. The sequence illustrated in FIG. 9 may begin a write operation (intended for media controller 120A) based on the redundancy controller 110A sending, at arc 902, a request to obtain a stripe lock from the media controller 120B that hosts the parity cacheline. At arc 904, media controller 120B has determined that the stripe is not already locked and grants the lock to redundancy controller 110A. At arc 906, the redundancy controller 110A attempts to read old data. However, the media controller 120A experiences a media controller or uncorrectable memory device failure 908, wherein the media controller 120A is still partially functional and able to enter containment mode. For example, the media controller 120A may be part of a memory module having memory that has catastrophically failed, while the media controller 120A itself is capable of sending a containment mode indication. Thus, at arc 913, the media controller 120A sends a containment mode indication instead of a normal read response. The redundancy controller 110A therefore enters RAID degraded mode based on the containment mode indication 913, effectively ignoring the media controller 120A whose data will now become progressively stale over time.

However, the write operation of FIG. 9 was initially intended for the media controller 120A. Thus, RAID degraded mode is used perform other operations, for each write intended for failed media controller 120A, instead of directly writing to failed media controller 120A. Accordingly, in arcs 914, 916, the redundancy controller 110A reads data B from media controller 120C. The redundancy controller 110A computes new parity, e.g., new parity=new data for data A^data B (where data A represents the data that would have been on media controller 120A). At arc 918, the redundancy controller 110A writes new parity to media controller 120B, receiving a completion indication at arc 920. The redundancy controller 110A then requests and is granted completion of releasing the stripe lock via arcs 922, 924. Next, at numeral 926, the system loses power (planned or unplanned).

The system is rebooted at numeral 928 (whereby media controller 120A is now appearing to be healthy, the prior failure having been intermittent). However, this illustrates a hazard, whereby the system was brought up without operating redundancy controller 110B in degraded mode and treating the media controller 120A as having stale data. Accordingly, the redundancy controller 110B is able to read/receive stale data from media controller 120A, via arcs 930, 932, because redundancy controller 110A had earlier performed a write (originally intended for media controller 120A) in degraded mode, whereby the new parity was written to media controller 120B instead. Such a hazard and undesirable result can be avoided by using the example journaling techniques described above and as illustrated in FIG. 10.

Figure 10:
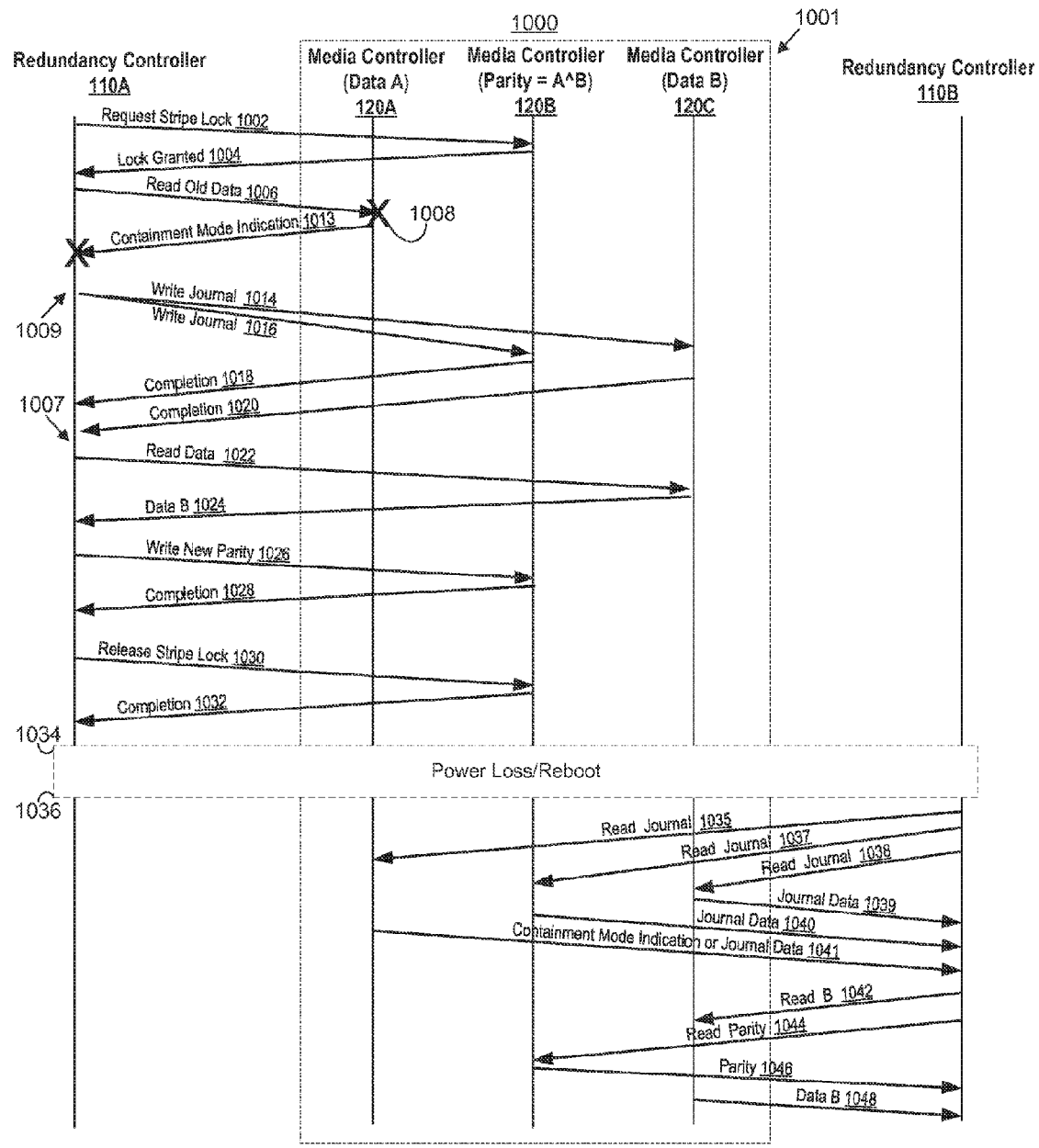
FIG. 10 is a bounce diagram of a redundancy controller illustrating a media controller failure, containment mode indication, journaling, and degraded mode write operation according to an example.

FIG. 10 is a bounce diagram 1000 of a redundancy controller 110A illustrating a media controller failure 1008, containment mode indication 1013, journaling 1009, and degraded mode write operation 1007 according to an example. FIG. 10 illustrates an example of avoiding the hazard of obtaining stale data, as a result of using journaling to ensure proper entry into degraded mode even after a system reboot. The sequence illustrated in FIG. 10 may begin a write operation (intended for media controller 120A) based on the redundancy controller 110A sending, at arc 1002, a request to obtain a stripe lock from the media controller 120B that hosts the parity cacheline. At arc 1004, media controller 120B has determined that the stripe is not already locked and grants the lock to redundancy controller 110A. At arc 1006, the redundancy controller 110A attempts to read old data. However, the media controller 120A experiences a media controller or uncorrectable memory device failure 1008, wherein the media controller 120A is still partially functional and able to enter containment mode. For example, the media controller 120A may have memory that has catastrophically failed, while the media controller 120A itself is capable of sending a containment mode indication. Thus, at arc 1013, the media controller 120A sends a containment mode indication instead of a normal read response. The redundancy controller 110A therefore enters RAID degraded mode based on the containment mode indication 1013, effectively ignoring the media controller 120A whose data will now become progressively stale over time.

The redundancy controller 110A now performs, in response to the containment mode indication 1013 and the impending entry into degraded mode, journaling 1009 to ensure that the journals on a plurality of media controllers reflect the entry of the impending redundancy controller 110A into degraded mode at 1013. More specifically, the redundancy controller 110A issues a journal write request to media controllers 120B, 120C via arcs 1014, 1016, and receives corresponding completion indications via arcs 1018, 1020. The journaling 1009 may be performed in response to a failed primitive, such as a timed-out write, or a read or write that receives a containment mode indication (e.g. containment mode indication 1013). A persistent journal may be stored in the non-volatile memory of the memory module associated with a corresponding media controller.

The write operation of FIG. 10 was initially intended for the media controller 120A, which has failed. Thus, RAID degraded mode is used to perform other operations, for each write intended for failed media controller 120A, instead of directly writing to failed media controller 120A. Accordingly, in arcs 1022, 1024, the redundancy controller 110A begins the degraded mode write operation 1007 and reads/receives data B from media controller 120C. The redundancy controller 110A computes new parity, e.g., new parity=new data for data A^data B (where data A represents the data that would have been on media controller 120A). At arc 1026, the redundancy controller 110A writes new parity to media controller 120B, receiving a completion indication at arc 1028. The redundancy controller 110A then requests and is granted completion of releasing the stripe lock via arcs 1030, 1032. Next, at numeral 1034, the system loses power (planned or unplanned).

The system is rebooted at numeral 1036 (whereby media controller 120A is now available). However, prior to reading data, the system reads multiple copies of the journal, to determine whether there is a need for operation of a redundancy controller (e.g., redundancy controller 110B planning to read data B) in degraded mode and treating the media controller 120A as having stale data. Accordingly, the redundancy controller 110B is able to read/receive journal data from media controllers 120A-C via arcs 1035, 1037, 1038, 1039, 1040, 1041. The journal reads inform the redundancy controller 110B regarding which media controllers 120A-C are functional and which are stale and/or failed. Some journal reads (e.g., see arc 1041) may return a containment mode indication, or no response resulting in a timeout. In that case, the memory module hosting those journals (associated with the corresponding media controller) is evidently failed. However, a stale journal may also be stored on a previously-failed memory module that, after reboot, appears to be functioning (due to intermittency). Thus, a journal may be interpreted using corroboration from other journals. The redundancy controller 110B can identify which journals to trust, versus which journals (if any) to disregard as being stale, based on various techniques. For example, techniques include but not limited to: 1) majority voting across all journals; 2) unanimity voting across a subset of journals that are all found to indicate failure of those memory modules hosting the journals that are not part of the subset; 3) date and time stamping of journal entries, and unanimity voting across the most recently written journals; 4) serial numbering of journal entries and unanimity voting across the most recently-numbered journal entries; and so on.

The journal data received via arcs 1039-1041 (as applicable, depending whether arc 1041 results in returned data) indicates that media controller 120A cannot be trusted, and that redundancy controller 111B should therefore enter degraded mode (e.g., prior to having a chance to read any stale data by not using degraded mode as shown in FIGS. 8 and 9). Accordingly, the redundancy controller 110B can effectively perform reads, initially intended for now failed media controller 120A, by instead calculating the data A that would have been on media controller 120A, based on degraded mode information obtained from media controllers 120B, 120C. More specifically, redundancy controller 110B may read the data B from media controller 120C via arcs 1042, 1048, and read the parity from media controller 120B via arcs 1044, 1046. With that information, the redundancy controller 110B may calculate data A as data A=parity^data B.

Figure 11:
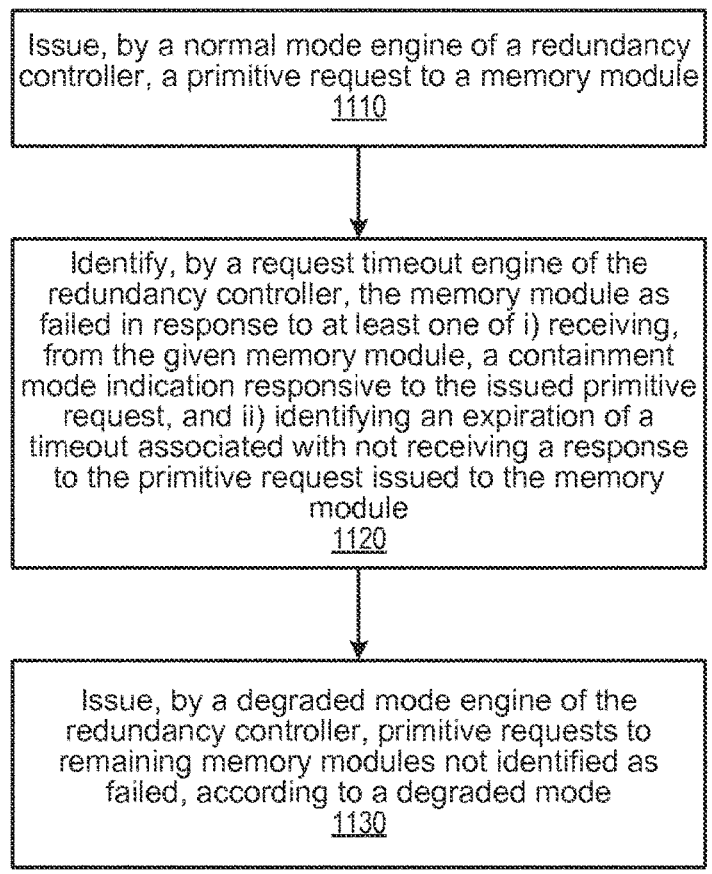
FIG. 11 is a flow chart based on identifying a memory module as failed according to an example.
Figure 12:
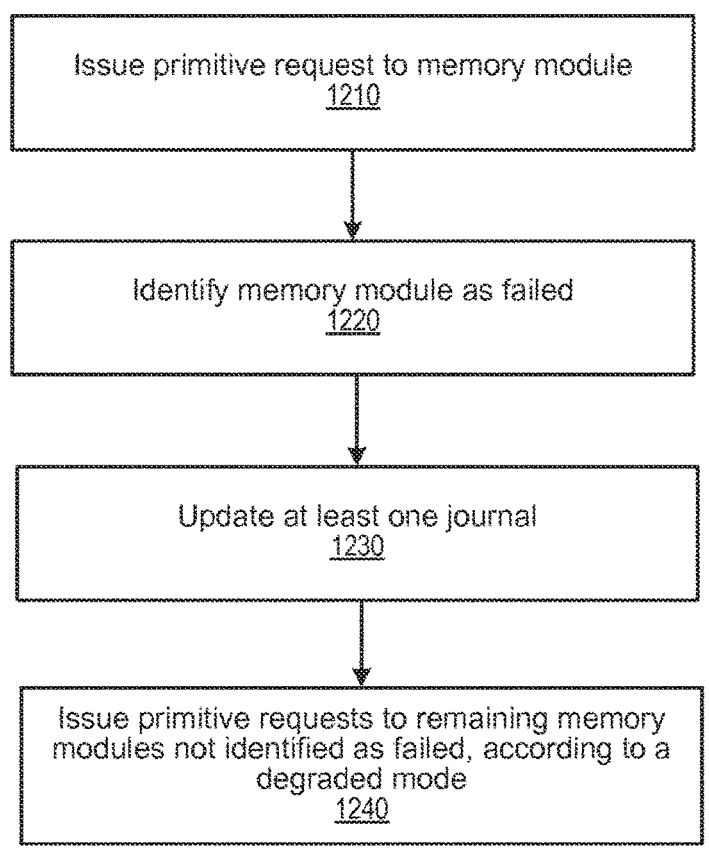
FIG. 12 is a flow chart based on updating a journal according to an example.

Referring to FIGS. 11 and 12, flow diagrams are illustrated in accordance with various examples of the present disclosure. The flow diagrams represent processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

FIG. 11 is a flow chart 1100 based on identifying a memory module as failed according to an example. In block 1110, a normal mode engine of a redundancy controller is to issue a primitive request to a memory module. For example, the normal mode engine may issue a read request to a media controller of a memory module, and keep track of how much time elapses for that read request until receiving a response to that read request. In block 1120, a request timeout engine of the redundancy controller is to identify the memory module as failed in response to at least one of i) receiving, from the given memory module, a containment mode indication responsive to the issued primitive request, and ii) identifying an expiration of a timeout associated with not receiving a response to the primitive request issued to the memory module. For example, the memory module may be partially failed and functional, and able to send a containment mode indication in response to the primitive request. Alternatively, the memory module may be catastrophically failed and incapable of responding within the period before expiration of the timeout associated with the primitive request. In block 1130, a degraded mode engine of the redundancy controller is to issue primitive requests to remaining memory modules not identified as failed, according to a degraded mode. For example, instead of issuing a normal write to the failed memory module, the redundancy controller may instead use degraded mode to read data from other (not failed) memory module(s), and calculate new parity based on the data that would have been written to the failed memory module, and write that new parity to yet another (parity) memory module.

FIG. 12 is a flow chart 1200 based on updating a journal according to an example. In block 1210, a primitive request is issued to a memory module. For example, a redundancy controller issues a write request. In block 1220, the memory module is identified as failed. For example, the redundancy controller may identify expiration of a timeout associated with the write request without receiving a response to the write request. Or, the redundancy controller may receive a containment mode indication from the memory module, whereby the memory module has recused itself. In block 1230, at least one journal is updated. For example, the redundancy controller can write a journal entry onto a plurality of other, non-failed memory modules. In block 1240, primitive requests are issued to remaining memory modules not identified as failed, according to a degraded mode. For example, the redundancy controller may use a combination of good data from remaining non-failed memory modules (including existing stored data and parity), along with new data that was supposed to be written to the failed memory module, to calculate resulting changes to data and/or parity and effectively achieve a write in degraded mode.

Examples provided herein may be implemented in hardware, software, or a combination of both. Example systems and/or engines can include a processor and memory resources for executing instructions stored in a tangible non-transitory medium (e.g., volatile memory, non-volatile memory, and/or computer readable media). Non-transitory computer-readable medium can be tangible and have computer-readable instructions stored thereon that are executable by a processor to implement examples according to the present disclosure.

An example system (e.g., a computing device) can include and/or receive a tangible non-transitory computer-readable medium storing a set of computer-readable instructions (e.g., software). As used herein, the processor can include one or a plurality of processors such as in a parallel processing system. The memory can include memory addressable by the processor for execution of computer readable instructions. The computer readable medium can include volatile and/or non-volatile memory such as a random access memory ("RAM"), magnetic memory such as a hard disk, floppy disk, and/or tape memory, a solid state drive ("SSD"), flash memory, phase change memory, and so on.

What is claimed is:

1. A redundancy controller to prevent data corruption and single point of failure in a fault-tolerant memory fabric with a plurality of memory modules, the redundancy controller comprising:
a normal mode engine to issue a primitive request to a memory module;
a request timeout engine to identify the memory module as failed in response to at least one of i) receiving, from the memory module, a containment mode indication responsive to the primitive request, and ii) expiration of a timeout associated with not receiving a response to the primitive request; and
a degraded mode engine to issue primitive requests to remaining memory modules not identified as failed, according to a degraded mode, wherein reads of data located on a failed memory module by the degraded mode engine use parity-reconstruction to reconstruct data on the failed memory module from surviving memory modules serving a stripe and wherein writes to data located on the failed memory module use parity reconstruction to reconstruct lost pre-write data, followed by using the reconstructed lost pre-write data for a new parity value to be written to a healthy memory model that holds parity of the stripe.

2. The redundancy controller of claim 1, further comprising a journaling engine to, in response to the given memory module being identified as failed, record the given memory module as failed in at least one journal.

3. The redundancy controller of claim 2, wherein prior to mounting a redundant array of independent disks (RAID) grouping of the plurality of memory modules, the redundancy controller is to examine the at least one journal associated with the RAID grouping to identify whether one or more redundancy controllers associated with the RAID grouping had previously entered degraded mode, and if so, mount the RAID grouping directly in degraded mode.

4. The redundancy controller of claim 2, wherein the journaling engine is to store the at least one journal on a reserved persistent portion of a corresponding at least one memory module.

5. The redundancy controller of claim 4, wherein the at least one journal includes metadata pertaining to memory of the corresponding at least one memory module, such that the at least one journal remains with its corresponding at least one memory even if mechanically removed from the at least one memory module.

6. The redundancy controller of claim 4, wherein the journaling engine is to update a plurality of journals across a plurality of memory modules.

7. The redundancy controller of claim 6, wherein the journaling engine is to synchronously update the plurality of journals subsequent to identifying the given memory module as failed in a RAID group, but prior to performing degraded-mode access to the plurality of memory modules.

8. The redundancy controller of claim 1, wherein the degraded mode engine is to issue primitive requests to remaining not-failed memory modules according to the degraded mode, for data associated with a RAID stripe spanning across a plurality of memory modules.

9. A memory module to prevent data corruption and single point of failure in a fault-tolerant memory fabric with a plurality of redundancy controllers, the memory module comprising:
a normal mode engine to respond to primitive requests from redundancy controllers;
a fault condition engine to identify a fault condition with the memory module; and
a containment mode engine to issue, subsequent to the fault condition having been identified by the fault condition engine, containment mode indications in response to primitive requests received from redundancy controllers, wherein the containment mode indications are transmitted to the plurality of redundancy controllers so as to coordinate entry of redundancy controllers into degraded mode.

10. The memory module of claim 9, wherein the fault condition engine is to identify the fault condition based on actively detecting a failure mode associated with increased risk of at least one of intermittent failure, transient failure, and address-dependent failure of the memory module.

11. The memory module of claim 9, wherein the memory module includes a media controller and a memory, and the fault condition is associated with a fault in at least one of i) the memory and ii) a connection between the memory and the media controller.

12. The memory module of claim 11, further comprising a journal stored on a reserved portion of the memory, indicative of a status of at least one memory module.

13. The memory module of claim 12, wherein the journal is replicated across a plurality of memory modules, and the journal of a given memory module contains information regarding a status of the plurality of memory modules.

14. A redundancy controller to prevent data corruption and single point of failure in a fault-tolerant memory fabric with a plurality of memory modules, the redundancy controller comprising:
- a normal mode engine to issue a primitive request to a memory module;
- a request timeout engine to identify the memory module as failed in response to at least one of i) receiving, from the memory module, a containment mode indication responsive to the primitive request, and ii) expiration of a timeout associated with not receiving a response to the primitive request; and
- a degraded mode engine to issue primitive requests to remaining memory modules not identified as failed, according to a degraded mode;
- a journaling engine to, in response to the given memory module being identified as failed, record the given memory module as failed in at least one journal, wherein prior to mounting a redundant array of independent disks (RAID) grouping of the plurality of memory modules, the redundancy controller is to examine the at least one journal associated with the RAID grouping to identify whether one or more redundancy controllers associated with the RAID grouping had previously entered degraded mode, and if so, mount the RAID grouping directly in degraded mode.

* * * * *